(12) United States Patent
Kimura et al.

(10) Patent No.: US 7,684,064 B2
(45) Date of Patent: Mar. 23, 2010

(54) PRINT JOB AUTHENTICATION

(75) Inventors: Yoshio Kimura, Kanagawa (JP); Kazuhiko Ushiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1511 days.

(21) Appl. No.: 10/975,357

(22) Filed: Oct. 29, 2004

(65) Prior Publication Data

US 2005/0100378 A1      May 12, 2005

(30) Foreign Application Priority Data

Nov. 12, 2003   (JP)   ............................. 2003-383035
Sep. 30, 2004   (JP)   ............................. 2004-287995

(51) Int. Cl.
*G06K 15/00* (2006.01)
(52) U.S. Cl. ...................... 358/1.14; 358/1.15; 380/55; 713/168
(58) Field of Classification Search .................. 380/55; 713/168, 176; 358/1.14, 1.15
See application file for complete search history.

(56) References Cited

U.S. PATENT DOCUMENTS

| | | | | |
|---|---|---|---|---|
| 5,633,932 | A * | 5/1997 | Davis et al. ................. | 713/176 |
| 5,752,697 | A | 5/1998 | Mandel et al. .............. | 271/288 |
| 6,378,070 | B1 | 4/2002 | Chan et al. .................. | 713/155 |
| 7,230,731 | B2 * | 6/2007 | Dan et al. ................... | 358/1.14 |
| 7,284,061 | B2 * | 10/2007 | Matsubayashi et al. ..... | 713/168 |
| 7,304,757 | B2 * | 12/2007 | Parry et al. ................. | 358/1.15 |
| 7,305,556 | B2 * | 12/2007 | Slick et al. .................. | 713/168 |
| 2003/0182438 | A1 * | 9/2003 | Tenenbaum ................. | 709/232 |
| 2003/0199267 | A1 | 10/2003 | Iwasa et al. ................. | 455/410 |
| 2004/0012812 | A1 | 1/2004 | Shimizu .................... | 358/1.15 |
| 2004/0095595 | A1 * | 5/2004 | Jacobsen ................... | 358/1.14 |
| 2005/0046876 | A1 * | 3/2005 | Burget et al. ............... | 358/1.15 |

FOREIGN PATENT DOCUMENTS

| | | |
|---|---|---|
| EP | 1 315 076 | 5/2003 |
| JP | 7-125391 | 5/1995 |
| JP | 8-39898 | 2/1996 |

(Continued)

*Primary Examiner*—Twyler L Haskins
*Assistant Examiner*—Nicholas C Pachol
(74) *Attorney, Agent, or Firm*—Fitzpatrick, Cella, Harper & Scinto

(57) ABSTRACT

In order to maintain high security of a job that requires a high security level even after a print interrupt factor has been removed, and to achieve both the effect of maintaining high security of a job that requires a high security level even after the print process is interrupted, and the effect of improving the productivity of jobs other than a job of this type, when a print apparatus which can process a plurality of print jobs including a print job of a first type and that of a second type restarts a print operation of a print job, which is interrupted in the print apparatus, and when the print job is a print of the first type, the print apparatus is controlled to execute an authentication process, and then allowed to restart the print operation of the print job. When the print apparatus restarts a print operation of a print job, which is interrupted in the print apparatus, and when the print job is a print of the second type, the print apparatus is allowed to restart the print operation of the print job without executing the authentication process.

11 Claims, 21 Drawing Sheets

FOREIGN PATENT DOCUMENTS

| | | |
|---|---|---|
| JP | 8-83153 | 3/1996 |
| JP | 9-65148 | 3/1997 |
| JP | 9-134264 | 5/1997 |
| JP | 11-296327 | 10/1999 |
| JP | 2001-117744 | 4/2001 |
| JP | 2002-283677 | 10/2002 |
| KR | 2003-84791 | 11/2003 |

* cited by examiner

FIG. 3

PRINT

PRINTER
- PRINTER NAME(N): PRINT APPARATUS 001 ▼ — 302
- STATUS: IDLING
- TYPE: PRINT APPARATUS 001
- LOCATION: IP_172.24.93.173
- COMMENT:

PROPERTY(P) — 301

☐ OUTPUT TO FILE(L)

PRINT RANGE
- ⦿ ALL(A)
- ○ CURRENT PAGE(E)   ○ SELECTED PART(S)
- ○ DESIGNATE PAGES(G): [    ]

DESIGNATE PAGES BY DELIMITING PAGE NUMBERS BY COMMAS LIKE 1,3,6, OR DESIGNATE PAGE RANGE LIKE 4-8

NUMBER OF COPIES TO BE PRINTED
- NUMBER OF COPIES(C): 1
- ☑ PRINT FOR COPIES(T)

OBJECT TO BE PRINTED(W): DOCUMENT ▼
PRINT DESIGNATION(R): ALL PAGES ▼

ENLARGEMENT / REDUCTION
- NUMBER OF PAGES PER SHEET(H): 1 PAGE ▼
- DESIGNATE PAPER SIZE(Z): NO MAGNIFICATION DESIGNATION ▼

[OPTION(O)...]   [OK]   [CANCEL]

FIG. 15

```
<ESC>%-12345X@PJL JOB COMMENT *Start Job*<CR><LF>
@PJL JOB NAME="xxx"<CR><LF>
@PJL SET USERNAME=xxx<CR><LF>
@PJL SET JOBMODE=SECUREPRINT<CR><LF>
@PJL SET DUPLEX=OFF<CR><LF>
@PJL SET COPIES=1<CR><LF>
@PJL ENTER LANGUAGE=LIPS<CR><LF>
........
<ESC>%-12345X<CR><LF>
```

PRINT JOB AUTHENTICATION

FIELD OF THE INVENTION

The present invention relates to a print technique that prints based on a print job and, more particularly, to a print technique which is suitable for a print apparatus and print system, which can handle a print job to be started after an authentication process.

BACKGROUND OF THE INVENTION

In recent years, with the advent of networked business machines, a plurality of client computers commonly use a single print apparatus connected to a network in an office. In such use environment, a third party may remove or take a look at output prints without authorization. Such situation poses a problem in case of a print process to be done while assuring security, e.g., when confidential information or private information which must be kept confidential from any third party is to be printed.

As a method of solving the aforementioned problem, the following technique has been proposed (for example, see Jpn. Pat. Appln. KOKAI Publication Nos. 8-39898, 8-83153, and 9-65148).

A printer driver which submits a password in addition to print job data is installed on a client computer, and an instruction of a print process is issued to a print apparatus using this printer driver.

Upon reception of the print job data and password, the print apparatus temporarily saves these print job data and password data in its internal storage medium in place of immediately starting a print job.

When the user wants to control the print apparatus to print according to this print job data, he or she uses a user interface equipped on the print apparatus to display a print job list on the user interface, selects a print job to be printed from the displayed job list, and inputs a password. Only when the input password matches the password stored in the storage medium, the print apparatus starts a print process according to this print job data. The user can receive a target confidential document without being looked at or stolen by a third party, since he or she is already in front of the print apparatus.

With the above method, the print apparatus must have a storage medium with a certain capacity. As a method that does not require any storage medium with a certain capacity in the print apparatus, a method of preparing a print server, and temporarily saving print job data in the print server is available (for example, see Jpn. Pat. Appln. KOKAI Publication No. 0.11-296327).

More specifically, for example, the user mounts an IC card on a client computer, saves an ID in the IC card, and submits print job data to the print server in a print process. Upon completion of submission of the print job data to the print server, the user goes to the location of the print apparatus and mounts the IC card on the print apparatus. The print apparatus acquires the ID from the mounted IC card, downloads a print job with that ID from the print server, and prints according to that print job. The user can receive a target confidential document without being looked at or stolen by a third party, since he or she is already in front of the print apparatus. Also, since the print job need not be saved in the print apparatus, no storage medium with a certain capacity is required.

When a print job flows through the network, it may be illicitly received or copied. As a method that can cope with such case, a method in which a print job is encrypted and submitted, and the print apparatus that received the encrypted print job decrypts that job by inputting, e.g., a password is disclosed (for example, see Jpn. Pat. Appln. KOKAI Publication No. 9-134264).

However, in any of the aforementioned prior arts, after the password is input, and the print process of the print job data temporarily saved in the storage medium in the print apparatus starts, the print process itself of the print job read out from the storage medium after the password input is handled as a normal print job in the same manner as that of a print job which can be printed without any password input. That is, a print job that requires an authentication process (e.g., password input) is handled in a different way from a print job that does not require any authentication process (e.g., such print job is held in a storage medium) until its print job starts. However, once the print process has started, such print job is processed in the same manner as the print job that does not require any authentication process.

However, such method poses the following problem.

When a trouble that interrupts a print process has occurred during the print process (e.g., when an out-of-paper error has occurred or when a print sheet has jammed in the print apparatus), the user must attend to such trouble. After the trouble has been removed (e.g., after the user has replenished print sheets or has removed the jamming print sheet), the print process restarts. However, in such case, the print process restarts irrespective of print jobs which require or do not require password input (authentication process). Hence, even in a print job which requires an authentication process for the purpose of assuring security, the security of prints has already been jeopardized at that time.

SUMMARY OF THE INVENTION

The present invention has been made in consideration of the above situation, and has as its object to provide a technique that can print while maintaining security even when a trouble that requires interruption of a print process has occurred, and the print process restarts after the trouble is removed.

It is another object of the present invention to provide a convenient device and system which can maintain the security of a job that requires a high security level even after a print interrupt factor is removed, and can sufficiently consider the productivity of print jobs other than such job, e.g., can achieve both an effect of maintaining high security of a print job that requires a high security level, and an effect of improving the productivity of jobs other than a job of such kind, and to allow to build a use environment that can flexibly meet various needs of various users.

In order to achieve an object of the present invention, for example, a print apparatus of the present invention comprises the following arrangement.

That is, a print apparatus which comprises checking means for checking whether or not an authentication process is required to execute a print process based on a print job, first input means for, when the authentication process is required, prompting a user to input authentication data associated with the print job, and accepting the authentication data, and print means for executing a print process on the basis of a print job, a print process of which is permitted when the authentication data input by the first input means is authenticated, or a print job which does not require any authentication process to execute the print process, comprising:

second input means for, when it is ready to restart a print process of a secure print job, the print process of which is permitted when the authentication data is authenticated and is interrupted due to occurrence of a print interrupt factor, since the print interrupt factor is removed, prompting the user to input authentication data for the secure print job before the print process is restarted, and accepting the authentication data; and control means for, when the authentication data input by the second input means is authenticated, controlling the print means to restart the interrupted print process of the secure print job.

In order to achieve an object of the present invention, for example, a print method of the present invention comprises the following arrangement.

That is, a print method which comprises a checking step of checking whether or not an authentication process is required to execute a print process based on a print job, a first input step of prompting, when the authentication process is required, a user to input authentication data associated with the print job, and accepting the authentication data, and a print step of executing a print process on the basis of a print job, a print process of which is permitted when the authentication data input in the first input step is authenticated, or a print job which does not require any authentication process to execute the print process, comprising:

a second input step of prompting, when it is ready to restart a print process of a secure print job, the print process of which is permitted when the authentication data is authenticated and is interrupted due to occurrence of a print interrupt factor, since the print interrupt factor is removed, the user to input authentication data for the secure job before the print process is restarted, and accepting the authentication data; and a control step of controlling, when the authentication data input in the second input step is authenticated, a process in the print step to restart the interrupted print process of the secure print job.

In order to achieve an object of the present invention, for example, a job processing method of the present invention comprises the following arrangement.

That is, a job processing method suitable for a print apparatus which can process a plurality of print jobs including a print job of a first type and a print job of a second type, comprising:

a step of controlling, when the print apparatus restarts a print operation of a print job, which is interrupted in the print apparatus, and the print job is a print job of the first type, the print apparatus to execute an authentication process, and to allow the print apparatus to restart the print operation of the print job; and a step of controlling, when the print apparatus restarts a print operation of a print job, which is interrupted in the print apparatus, and the print job is a print job of the second type, to allow the print apparatus to restart the print operation of the print job without executing any authentication process in the print apparatus.

In order to achieve an object of the present invention, for example, a print apparatus of the present invention comprises the following arrangement.

That is, a print apparatus comprising:

a receptor unit for receiving a plurality of print jobs including a print job of a first type and a print job of a second type; and a controller for, when the print apparatus restarts a print operation of a print job, which is interrupted in the print apparatus, and when the print job is a print job of the first type, controlling the print apparatus to execute an authentication process and to allow the print apparatus to restart the print operation of the print job, wherein when the print apparatus restarts a print operation of a print job, which is interrupted in the print apparatus, and the print job is a print job of the second type, the print apparatus is controlled to allow to restart the print operation of the print job without executing any authentication process in the print apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 shows an example of an operation window to be displayed on a display unit of the PC of this system;

FIG. 15 shows an example of data indicating a print mode when a print job is a secure job mode, as data which is appended to print job data and indicates the print mode;

DETAILED DESCRIPTION OF THE PREFERRED EMBODIMENTS

Preferred embodiments of the present invention will now be described in detail in accordance with the accompanying drawings.

First Embodiment

Figure 1:
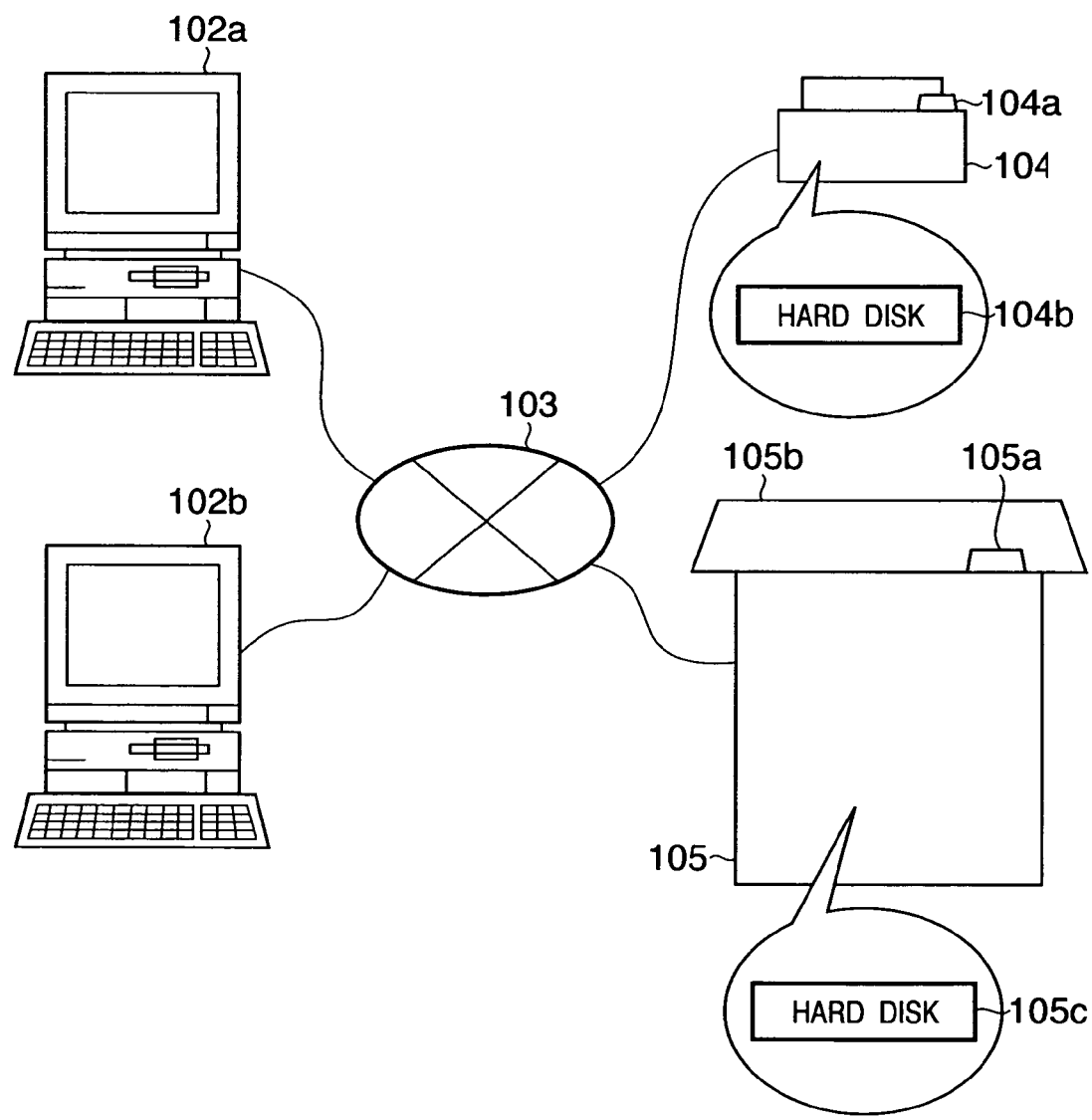
FIG. 1 is a schematic view showing the arrangement of a print system according to the first embodiment of the present invention.

FIG. 1 is a schematic view showing the arrangement of a print system according to this embodiment.

Reference numerals 102a and 102b denote PCs (personal computers) as an example of an information processing apparatus, which are respectively connected to print apparatuses 104 and 105 via a network 103 formed of a predetermined communication medium such as a LAN (which can be either a wired or wireless LAN), the Internet, or the like. In this system, a print job (including image data to be printed, and parameters such as various print process conditions and the like required upon printing that image data), which is generated on the PC side, is submitted to the print apparatus 104 or 105 via the network 103, so as to allow the print apparatus (104 or 105) to print data of that print job. Furthermore, the print apparatus (104 or 105) of this print system can handle a plurality of kinds of print jobs to be described later.

The print apparatus 104 comprises a hard disk 104b as a storage device which temporarily stores a print job submitted from the PC 102a or 102b. Also, the print apparatus 104 comprises an interface unit 104a used to input various setups and instructions in it. The print apparatus 104 prints according to a print job which is submitted from the PC 102a or 102b and is temporarily stored in the hard disk 104b.

The print apparatus 105 also equips a sorter 105b in addition to the arrangement of the print apparatus 104, and basically executes the same print process. The print apparatus 105 comprises a hard disk 105c as a storage device which temporarily stores a print job submitted from the PC 102a or 102b. Also, the print apparatus 105 comprises an interface unit 105a used to input various setups and instructions in it.

Note that FIG. 1 illustrates two each PCs and print apparatuses. However, the system according to this embodiment is not limited to such specific arrangement. Also, since various types of print apparatuses may be used, the print apparatuses are not limited to those which are shown in FIG. 1.

For example, in this embodiment, a print apparatus which has a print function will be mainly explained as a print apparatus. However, this embodiment also includes a print apparatus such as a copying machine or the like which comprises an input unit such as a scanner unit or the like and a print apparatus unit, and has a copy function, and can be applied to a case wherein the copying machine includes a storage unit such as a hard disk or the like, and a controller allows to handle a print job from the scanner unit via the storage unit. Furthermore, this embodiment can be applied to either a print apparatus as a multi-functional device which has a plurality of functions including a copy function, print function, another function (facsimile function), and the like, or a print apparatus as a single-function device which has only one of the plurality of functions.

Figure 12:
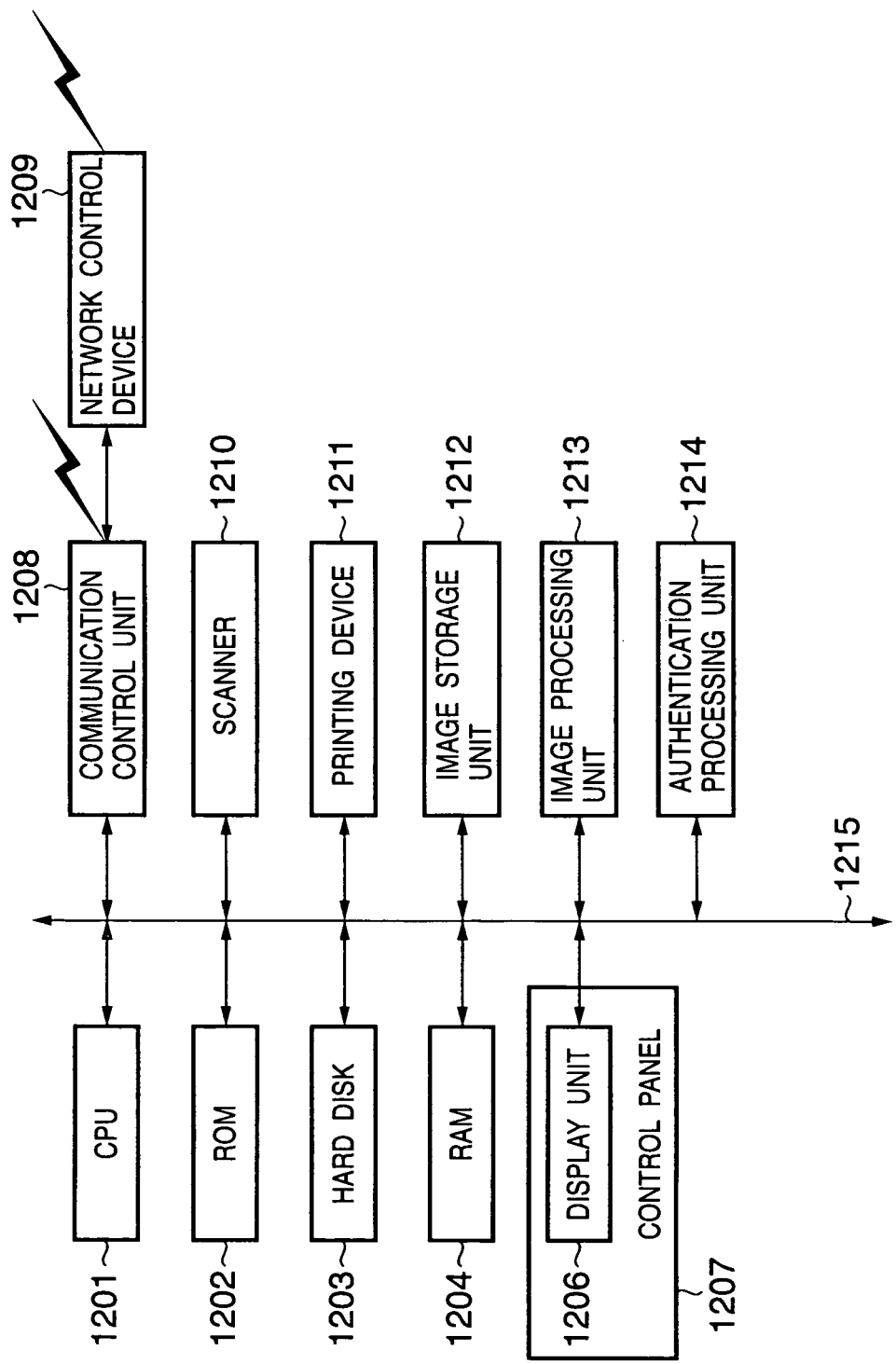
FIG. 12 is a block diagram showing an example of the print apparatus of this system.

FIG. 12 is a block diagram showing the basic arrangement of a print apparatus which can be applied as the print apparatus shown in FIG. 1.

A CPU 1201 as a central processing unit controls respective units of the print apparatus (including the operation control of respective units, the display control of a display unit and the like of a control panel, and the like) in accordance with control programs (including computer programs required to execute processes shown in various flowcharts to be described later) stored in a ROM (Read Only Memory) 1202 or hard disk 1203, and executes a print process to be described later.

The ROM 1202 stores the drive conditions, various setup data, a setup program, boot program, and the like of this apparatus, and these programs are to be executed by the CPU 1201.

The hard disk 1203 as an example of a storage unit saves programs and data which make the CPU 1201 execute a print process to be described later, and these programs and data are read out onto a RAM 1204 by the CPU 1201 as needed. Also, an area for temporarily saving externally submitted print job data (print job data of a print function) is assured in advance on the hard disk 1203.

When the print apparatus of this embodiment is a print apparatus of the type that also has a copy function and the like, the CPU 1201 controls the hard disk 1203 to store print job data (job data of a print function) output from an external device such as a host computer or the like, and to also store print job data scanned by the scanner unit (job data of a copy function). The CPU 1201 can control to apply the control to be described later to these print jobs.

The RAM 1204 has an area for temporarily storing programs and data which are read out from the ROM 1202 and hard disk 1203 by the CPU 1201, and also a work area which is used by the CPU 1201 to execute various processes.

A display unit 1206 displays the drive conditions and the status of this apparatus, various GUIs, results input by a control panel 1207 (to be described below), and the like.

The control panel 1207 includes so-called mechanical hardware keys such as a ten-key pad, start key, and the like used to input user's setups, instructions, and the like, software keys such as touch panel keys on an operation window of a touch panel type displayed on the display unit 1206, and the like.

A communication control unit 1208 connects this apparatus to the network 103 shown in FIG. 1 (if the network 103 is a wireless network, the unit 1208 serves as an interface for making this wireless communication), and serves as an interface for making data communications with the PCs (e.g., to receive print jobs from the PCs shown in FIG. 1). The communication control unit 1208 is also used in data communications with other devices.

A network control device 1209 serves as an interface for connecting this apparatus to PSTN (Public Switched Telephone Network). The network control device 1209 executes predetermined line control upon originating or receiving a call to connect or disconnect the line. Also, the network control device 1209 modulates/demodulates image data and a control signal using an internal modem, so as to execute facsimile transmission/reception via it.

A scanner 1210 scans characters, images, and the like recorded on a print medium such as a paper sheet or the like by a known scan technique as image data, and temporarily saves the scanned image data in the hard disk 1203.

A printing device 1211 prints according to a print job submitted from each PC or prints an image according to image data scanned by the scanner 1210. The printing device 1211 prints on print media such as a paper sheet, OHP sheet, and the like.

An image storage unit 1212 serves as a memory that temporarily stores image data scanned by the scanner 1210, and data of a print job received from each PC via the communication control unit 1208. The image storage unit 1212 may be assured in the hard disk 1203.

An image processing unit 1213 compresses and encodes image data to be transmitted from this apparatus, and expands and decodes compressed image data. The unit 1213 converts externally received print data into image data (rasterizes PDL code data from a host into bitmap data), or converts image data to be saved into an appropriate format or a format designated by the user (e.g., a PDF format). The unit 1213 executes an image correction process according to the optical response characteristics, variations of a sensor, and the like of the scanner 1210. The unit 1213 executes an image modification process such as an image zoom process or the like input by the user via the control panel 1207. Also, the unit 1213 executes an image optimization process that optimizes image data to be suited to the write characteristics or the like of the printing device 1211. The unit 1213 executes these processes according to requests. Also, the image processing unit 1213 executes a process for decrypting an encrypted print job by a known technique using a password appended to it when a print job submitted from each PC is encrypted.

An authentication processing unit 1214 executes various authentication processes to be described later.

A bus 1215 interconnects the aforementioned units.

Therefore, the print apparatus shown in FIG. 12 has a facsimile communication function of transmitting scanned image data, a transfer function of transferring data to a document management server computer, a copy function of printing out scanned image data, a reception print function of receiving received image data via facsimile, and a print function of printing according to a print job from a PC. The print apparatus can be used not only as a copying machine, but also as a facsimile device, printer device, and scanner device.

Note that a card reader for receiving a magnetic card registered with a department number and password may be mounted on the print apparatus shown in FIG. 12. In this case, the department number and password, which are set in advance in the ROM 1202 or hard disk 1203, are read out to execute an authentication process by the authentication processing unit 1214. After that, various functions can be implemented. Alternatively, the user may input the department number and password at the control panel 1207 to execute the authentication process by the authentication processing unit 1214.

As described above, this embodiment can adopt various authentication processes such as a method of making the user input a password from the control panel, and authenticating the user using the password, a method of making the user set an IC card or the like in a card reader, reading information of the IC card, and authenticating the user using the information of the card, and the like. This embodiment can be applied to a print apparatus which can implement at least one of a plurality of different types of authentication processes upon handling a print job.

The print system of the printing device 1211 is not particularly limited. For example, an ink-jet system, thermal head system, dot impact system, and the like may be adopted in addition to the electrophotographic print system.

Figure 2:
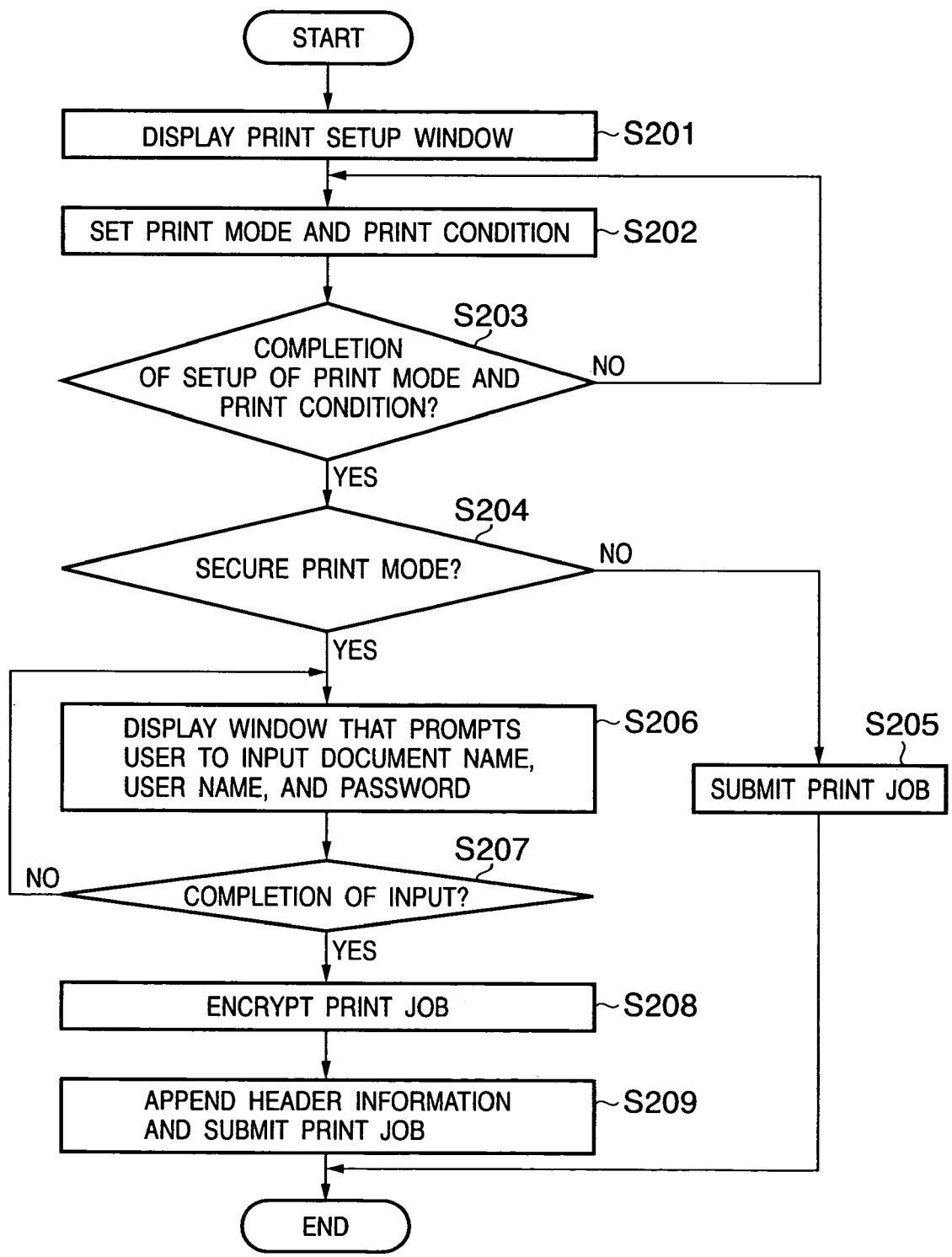
FIG. 2 is a flowchart showing an example of a process to be executed by a PC of this system.

FIG. 2 is a flowchart of the process mainly on the PC side under the control of a control unit (including a printer driver) of the PC when a print job is submitted to the print apparatus using a printer driver or the like installed in the PC to issue a print instruction.

A print setup window that allows the PC user to set various print conditions (print setup parameters) and a print mode, which are to be set to control the print apparatus to print the print data to be printed which is created via an application such as document creation software or the like of the PC is displayed on the display screen of the PC (step S201). Then, the control prompts the user to set the print conditions and print mode using a mouse and keyboard of the PC on the basis of this setup window (step S202).

FIG. 3 shows a display example of the print setup window, which is displayed on the display unit of the PC by the control unit of the PC of this embodiment. The window shown in FIG. 3 is used to set various print conditions such as a print count, print paper size, print range, and the like, and to also set the print mode to be described later. Also, the window is used to display guide information required for the PC operator to use the print apparatus, and confirmation information that allows the user to confirm print conditions set by himself or herself. That is, the window has both an operation instruction function from the user by user operations, and an information display function for the user. The user can set the various print conditions and print mode using an operation unit such as a mouse, keyboard, and the like on the setup window shown in FIG. 3. Reference numeral 301 denotes an operation instruction unit, which is expressed by a button icon. This button icon is used to input an instruction for displaying, on the display unit, a window that allows the user to make various print setups using a print apparatus, which is selected by the user via a popup menu key 302 (in FIG. 3, a print apparatus with a name "print apparatus 001" is selected by the user). When the user presses this button icon 301 using the mouse, keyboard, or the like of the PC, the control unit of the PC controls to display a window shown in FIG. 4 on the display window of the PC in response to this operation.

Figure 4:
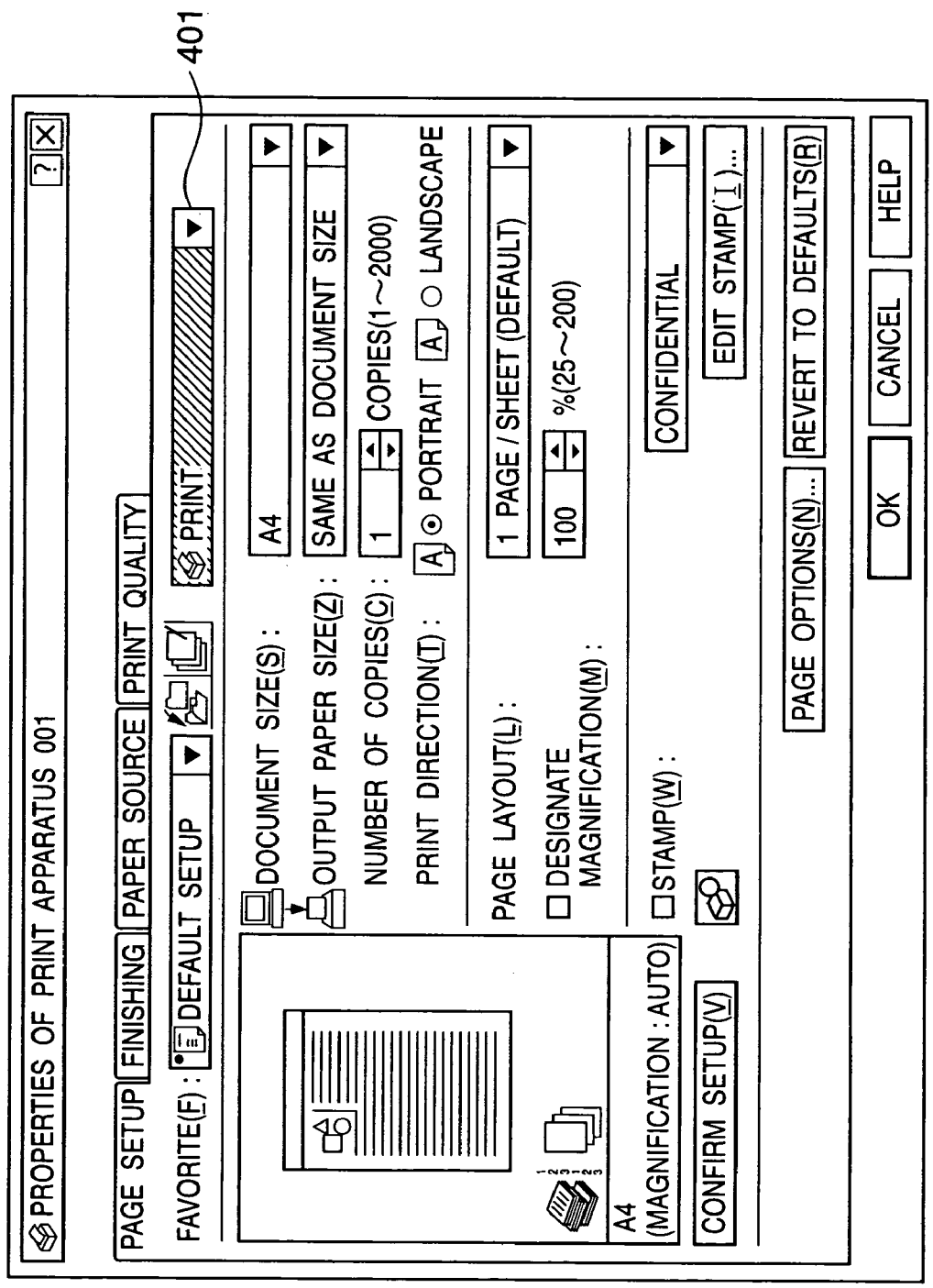
FIG. 4 shows an example of an operation window to be displayed on the display unit of the PC of this system.

FIG. 4 shows a display example of a window which is to be displayed on the display unit of the PC by the control unit of the PC of this embodiment, and allows the user to make various print setups using the print apparatus selected by the user via the popup menu key 302.

Figure 5:
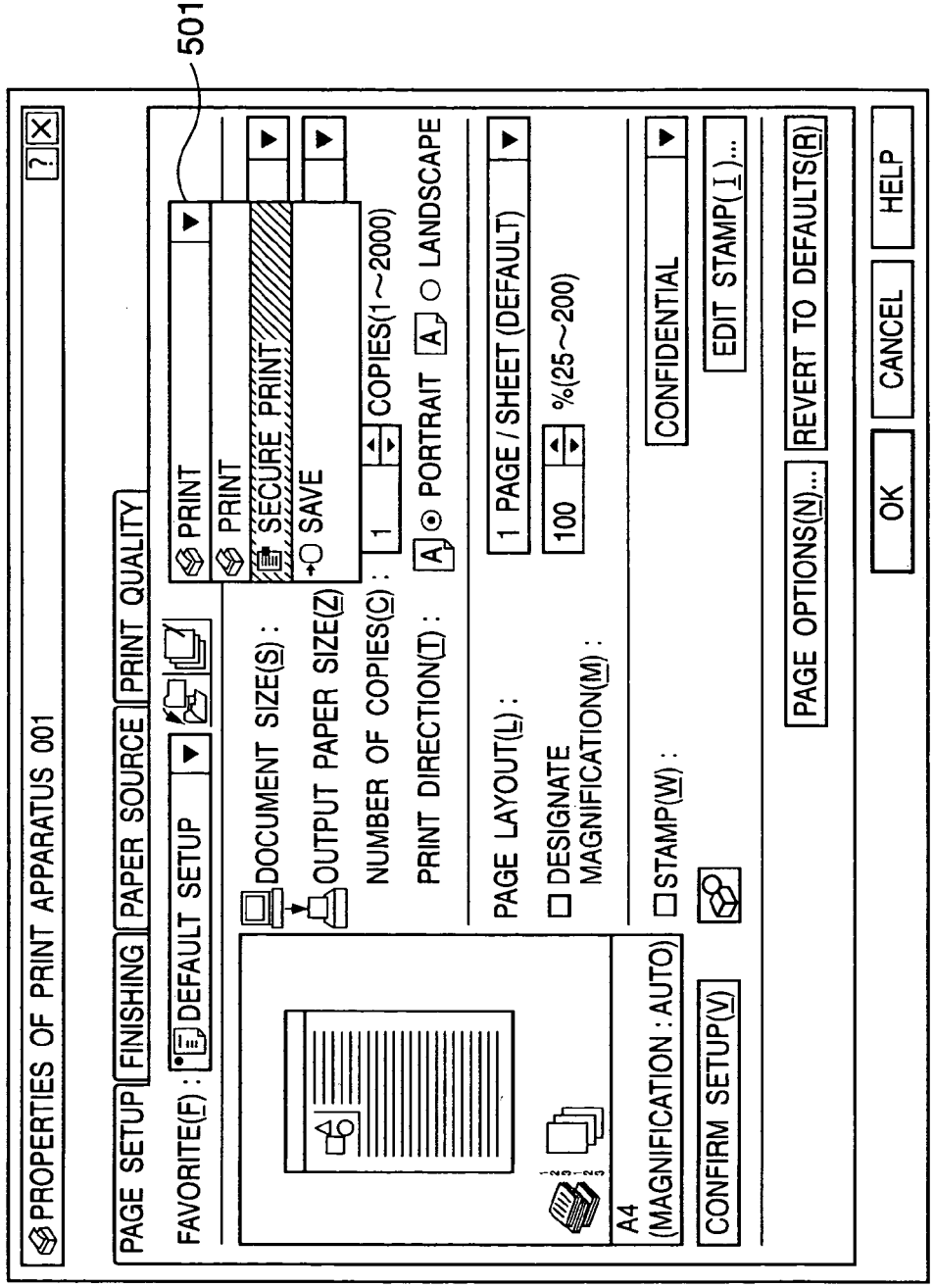
FIG. 5 shows an example of an operation window to be displayed on the display unit of the PC of this system.

When the user designates a popup menu key 401, which is used to input an instruction for displaying, on the display unit, a sub-operation window that allows the user to select one of a plurality of print modes, using the mouse, keyboard, or the like of the PC on the operation window shown in FIG. 4, the control unit of the PC controls to display an operation window that displays a menu 501 on the operation window shown in FIG. 4 so as to display a sub-menu window in response to that user operation, as shown in FIG. 5. This menu allows the user to select, determine, and set a print mode of a print job to be printed by the print apparatus of this system. This embodiment controls the apparatus to allow the user to select a desired one of a plurality of print modes including three print modes, i.e., "normal print mode" (print mode in FIG. 5), "secure print mode", and "save mode" via the menu 501.

Note that this embodiment is not limited to such specific print modes but may be applied to an apparatus which has, as print modes, at least a secure print mode (an operation mode that requires an authentication process upon executing a print process), and also non-secure print modes as other print modes different from the secure print mode (including at least an operation mode such as a normal print mode, save mode, or the like that does not require any authentication process upon executing a print process). This embodiment allows control which distinguishes a print job corresponding to the secure print mode (a job of such type will be referred to as a secure print job or print job of a first type in this embodiment) from those of the non-secure print modes (a job of such type will be referred to as a non-secure print job or print job of a second type in this embodiment). Even after the print process has started, the print job of the secure print mode can be controlled in a different way from that of the non-secure print mode, and this embodiment controls and arranges to reflect such distinction in an interrupt process and restart process of a print job.

Note that "normal print mode" is an operation mode that controls the print apparatus (104 or 105) of this system to execute a normal print process, i.e., an operation mode that controls the print apparatus to execute the same process as a normal print process. That is, in a print process sequence in which the PC submits a print job to the print apparatus that executes a print process, this mode inhibits the print apparatus from executing a sequence in which the user inputs authentication data via the user interface unit of the print apparatus such as the ten-key pad of the control panel 1207 as an example of the authentication unit of the print apparatus of this embodiment, and the print apparatus checks if the input authentication data is authentic and permits a print process if that data is authentic or inhibits the print process if it is not authentic. In this manner, the normal print mode corresponds to a print mode which is different from the print mode that requires an authentication process in the print apparatus of this embodiment upon executing a print process by the print apparatus.

Also, "secure print mode" is a mode that requires the user to input authentication data such as password information, IC card information, fingerprint information or the like on the print apparatus side when a print job (which includes only a print job output from the information processing apparatus such as the PC or the like when the print apparatus has only the print function but also includes a print job output from a scanner of the print apparatus when the print apparatus has the copy function) input to the print apparatus of this embodiment is printed by the print apparatus of this embodiment. When this mode is set and a print process is executed (when a print job is input to the print apparatus), the user is required to input the aforementioned authentication data (a password, IC card, biological authentication data such as a fingerprint, voice print, or the like, and so forth) via the user interface unit of the print apparatus such as the control panel 1207 or the like as a pre-procedure. That is, this print mode corresponds to an operation mode that requires an authentication process in the print apparatus of this embodiment upon executing the print process, as described above.

Furthermore, "save mode" is a mode which holds a print job (which includes a print job output from the information processing apparatus such as the PC or the like and/or a print job output from the scanner unit) input to the print apparatus in an appropriate storage unit (e.g., the hard disk 1203 or the like) which can be controlled by the control unit of the print apparatus of this embodiment without being immediately printed by the printer unit of the print apparatus of this embodiment, and starts a print process when the user inputs a print request instruction via the control panel of the print apparatus of this embodiment later.

The control unit of the print apparatus of this embodiment controls a print job of the save mode in a different way from that of the normal print mode since the print apparatus of this embodiment does not immediately print that job but starts a print job in response to a print start request from the control panel of the print apparatus of this embodiment. However, upon reception of the user's print start request from the control panel of the print apparatus, the control unit controls to receive the print request of the print job of the save mode, which is held in the storage unit, without especially requiring the user to input authentication data or the like and to permit start of the print process unlike in a case wherein a print job of the secure print mode is read out from the storage unit.

That is, in this embodiment, the save mode is independently prepared in a different way from the normal print mode in that a print job is to be immediately printed or is held in the storage unit, in consideration of user's merits. However, the apparatus is arranged and controlled to handle the save mode as a non-secure print mode in the same manner as the normal print mode, since it corresponds to a print mode that does not require any authentication process in the print apparatus of this embodiment upon executing the print process.

Figure 6:
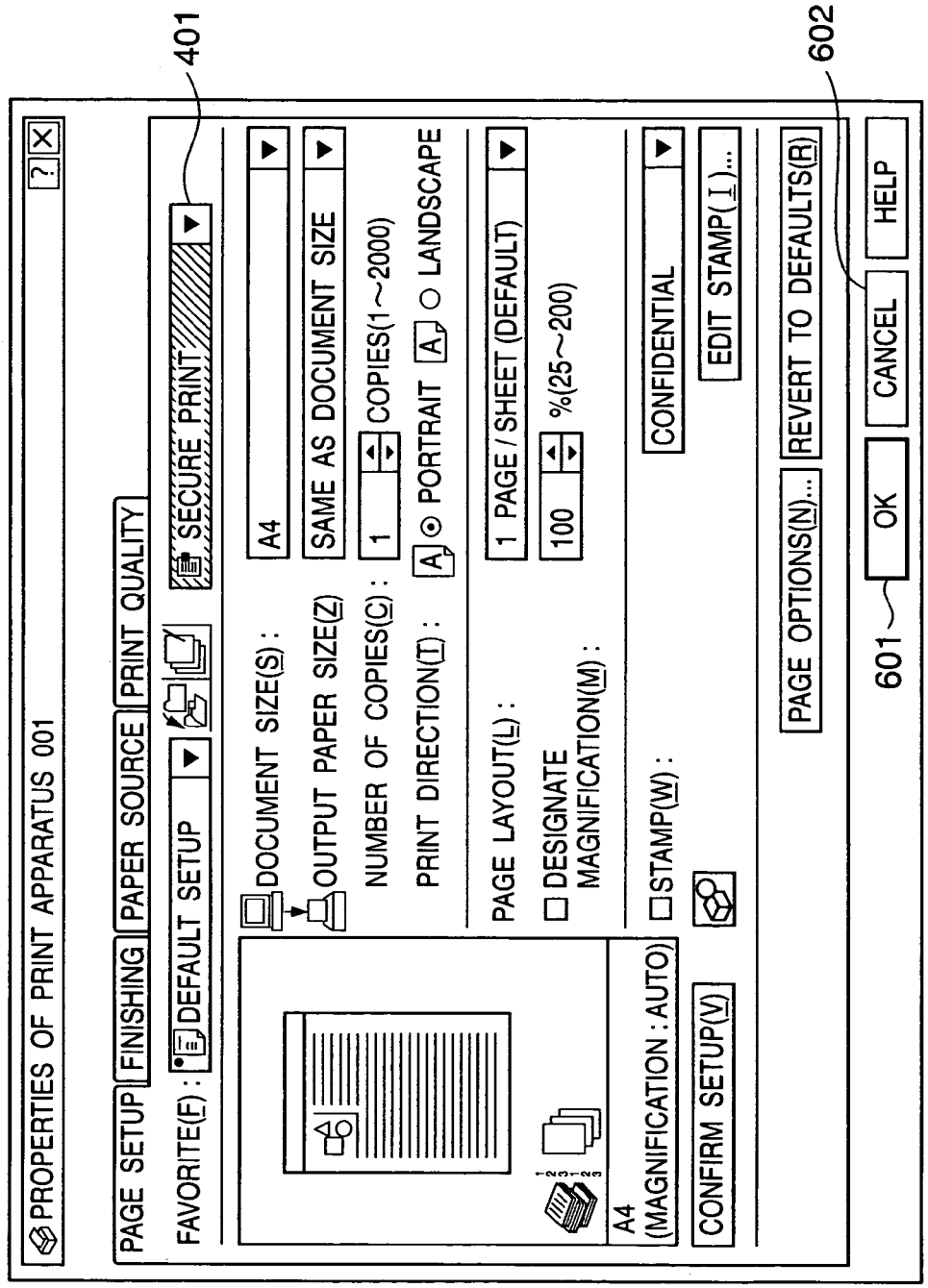
FIG. 6 shows an example of an operation window to be displayed on the display unit of the PC of this system.

When the PC user selects "secure print mode" from the menu 501 in FIG. 5, the control unit of the PC displays a character string "secure print" indicating that "secure print mode" has been selected from the popup menu 401 on the operation window, as shown in FIG. 6, in response to that user's operation.

When the user operates a "cancel" button 602 to issue a cancel instruction, the control unit of the PC cancels the print conditions and print mode set so far by the user and clears the window in response to this operation. However, upon reception of a settlement instruction by the user operation on an "OK" button 601, the control unit of the PC sets, for a print job to be input to the print apparatus, the print conditions (processing condition parameters of at least any of a plurality of processing conditions such as a document size, output paper size, the number of copies, print direction, page layout setup, magnification, stamp, and the like) and the print mode (an operation mode of user's choice of a plurality of operation modes such as the normal print mode, secure print mode, save mode, and the like), which are selected by the user via various operation windows mentioned above, thus completing the setup process.

If the control unit of the PC determines upon detection of a user's key operation on the operation window of the PC that the aforementioned setup process is complete (step S203), it checks based on the user's setup information if "secure print mode" is set (step S204). If the control unit determines as a result of checking that "secure print mode" is not set, the flow advances to step S205 to submit a print job which includes data to be printed and the print conditions and print mode as that of the non-secure print mode to the print apparatus which is selected by the user from the popup menu 302 (step S205).

Figure 7:
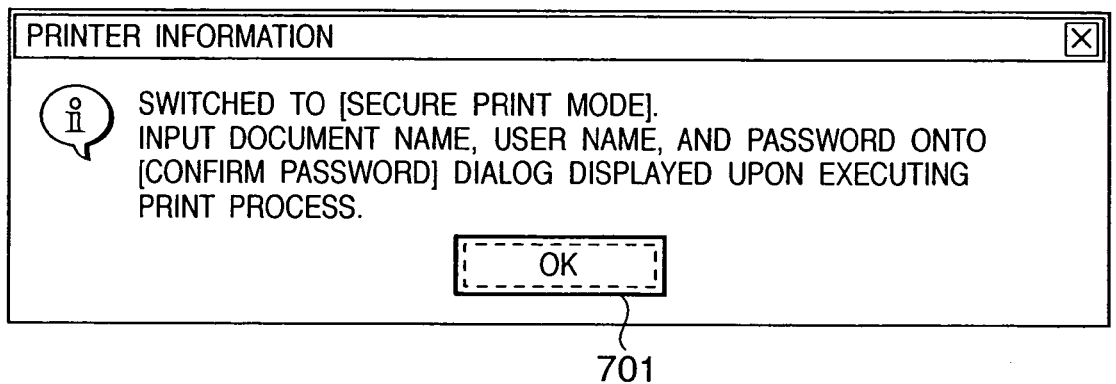
FIG. 7 shows an example of an operation window to be displayed on the display unit of the PC of this system.

On the other hand, if the control unit determines based on the user's setup information that "secure print mode" is set, the flow advances to step S206. Since the secure print mode is to be set, the control unit of the PC controls its operation unit to prompt the user to determine authentication data to be input via the user interface unit such as the control panel 1207 of the print apparatus upon printing on the print apparatus side (in this example, the control unit prompts the user to determine authentication data of a job to be handled as a secure print job upon inputting a print job to the print apparatus). For example, the control unit displays a window that prompts the PC user to determine and input desired authentication data for a job to be printed by this system on the display unit of the PC. FIG. 7 shows a display example of this window. In this embodiment, the control unit requests the user to input a password as this authentication data. The user can also input the user name and the name (document name in this embodiment) of a file to be printed via the user interface in addition to the password. Of course, arbitrary information can be input as the user name and file name, and a procedure can be carried out without any name inputs (in this case, default names are set).

Figure 8:
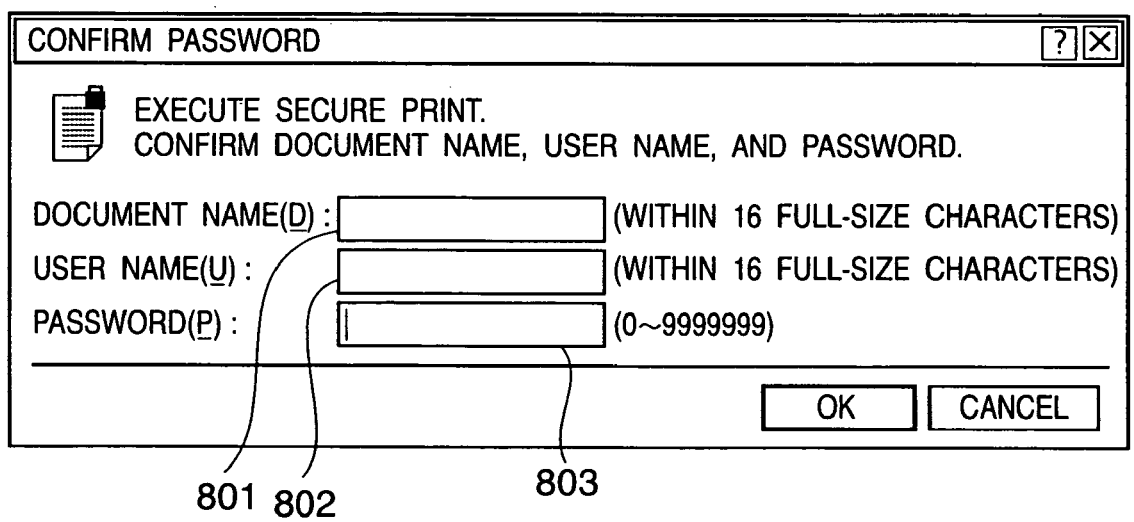
FIG. 8 shows an example of an operation window to be displayed on the display unit of the PC of this system.

If the user designates a button icon 701 using the mouse, keyboard, or the like of the PC on the window shown in FIG. 7, the control unit of the PC displays a window shown in FIG. 8 on the display unit of the PC in response to this operation (step S206). FIG. 8 shows a display example of a window which prompts the user to input necessary information to be input by himself or herself when the print apparatus prints based on a secure job.

Referring to FIG. 8, reference numeral 801 denotes a field used to input the name of a file to be printed. For example, when a document with a file name "document1" is to be printed, the user inputs "document1" in this field 801 using the keyboard.

Reference numeral 802 denotes a field used to input the user name. For example, when the user name is "user A", the user inputs "user A" in this field 802 using the keyboard.

Reference numeral 803 denotes a field used to input a password as an example of authentication data by the user himself or herself. That is, this field is used to prompt the user himself or herself to determine a password to be input before a print process so as to control the print apparatus to print the file to be printed in a setup stage on the PC side upon submitting a print job from the PC to the print apparatus, and allows the user to input authentication data to be registered and adopted as authentication data used in an authentication process required in the print process later using the operation unit such as the keyboard, or the like.

Figure 9:
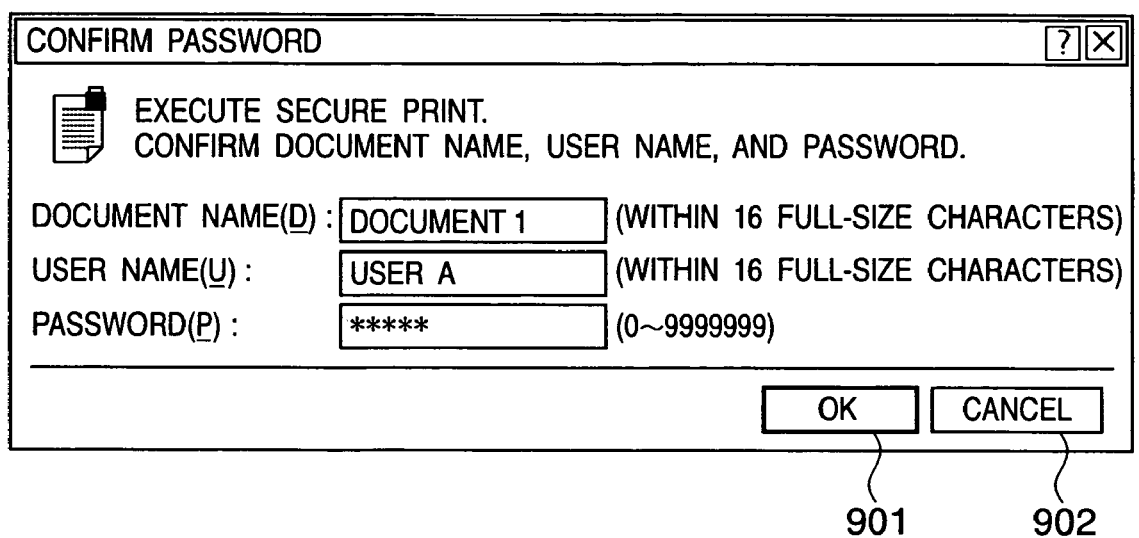
FIG. 9 shows an example of an operation window to be displayed on the display unit of the PC of this system.

FIG. 9 shows a display example of the window after items to be input to the respective fields are input on the window shown in FIG. 8.

Referring to FIG. 9, when the user designates an "OK" button icon 901 after he or she inputs data to be input to the respective fields, the items input to these fields are set. when the user designates a "cancel" button icon 902, items input to these fields are canceled.

Using these windows, items to be set upon selection of "secure print mode" can be set.

In case of a print job of the secure print mode, as described above, after the user inputs the three setup items (document name, user name, and password) on the window (see the UI shown in FIG. 8 or 9) displayed on the display unit of the PC in the process of step S206 and designates the "OK" button icon 901, the control unit of the PC advances the process to step S208 and applies an encryption process (e.g., a process for substituting a print job including data to be printed and print conditions) into a predetermined data sequence that can hardly be tampered with (step S208). The control unit appends the setup item data in step S206 and the print mode to the encrypted print job as a header, and submits that print job to the print apparatus selected from the popup menu 302 (step S209).

With the aforementioned processes, a print job upon selection of "secure print mode" is submitted to the print apparatus while being encrypted.

When the user clicks a "print" key via the menu 501 on the window of FIG. 5, the control unit selects the normal print mode, and controls the print apparatus of this system to process the print job to be processed in the normal print mode.

When the user clicks a "save" key via the menu 501 on the window of FIG. 5, the control unit sets the save mode, and controls the print apparatus of this system to process the print job to be processed in the save mode.

For both a print job of the normal print mode and that of the save mode, the control unit of the PC principally allows the user to set various print conditions (paper size, print direction, the number of copies, page layout, magnification, stamp, finishing step such as a sort process, staple process, and the like, paper source setup, quality setup, and the like) via various print setup windows shown in FIGS. 3 to 5 to be displayed on the display unit using the operation unit (corresponding to the user interface unit on the PC side) of the PC in the same manner as a print job of the secure print mode.

This system is configured to be able to input a series of image data to be printed together with such various print condition data and print mode information that allows the control unit of the print apparatus to identify a designated one of the plurality of print modes as a print job from the PC 102 to the print apparatus (104 or 105).

Note that a print job designated with the secure print mode as the print mode is submitted from the PC 102 to the print apparatus after authentication information (e.g., password) required for the control unit (CPU 1201) of the print apparatus (104 or 105) to determine if image data of that job can be printed by the print apparatus is appended to that print job.

In this way, the print system of this embodiment is configured to input a print job of the secure print mode from a generation source of the print job such as the information processing apparatus (e.g., host computer) or the like (also the scanner unit if the print apparatus has the copy function), and that of the non-secure print mode (normal print mode or save mode) to the print apparatus in accordance with user's setups, and the control unit of the print apparatus can selectively process such print jobs on the print apparatus side.

Note that this embodiment has two different security sequences, i.e., a first security sequence in which a print process of a print job of the secure print mode is permitted under the condition that appropriate authentication data is input at the print apparatus and an authentication process is appropriately done, and a second security sequence in which the PC submits an encrypted print job to the print apparatus, and the print job is decrypted (to a state before encryption) upon printing, as described above, in terms of security improvement. However, this embodiment is not limited to such specific sequences, but can be applied to an apparatus which has one of these sequences (e.g., an apparatus having only the first security sequence).

The print apparatus which receives a print job submitted from the PC by the aforementioned process and executes a print process on the basis of the received print job in the print system of this embodiment will be described below.

Figure 10:
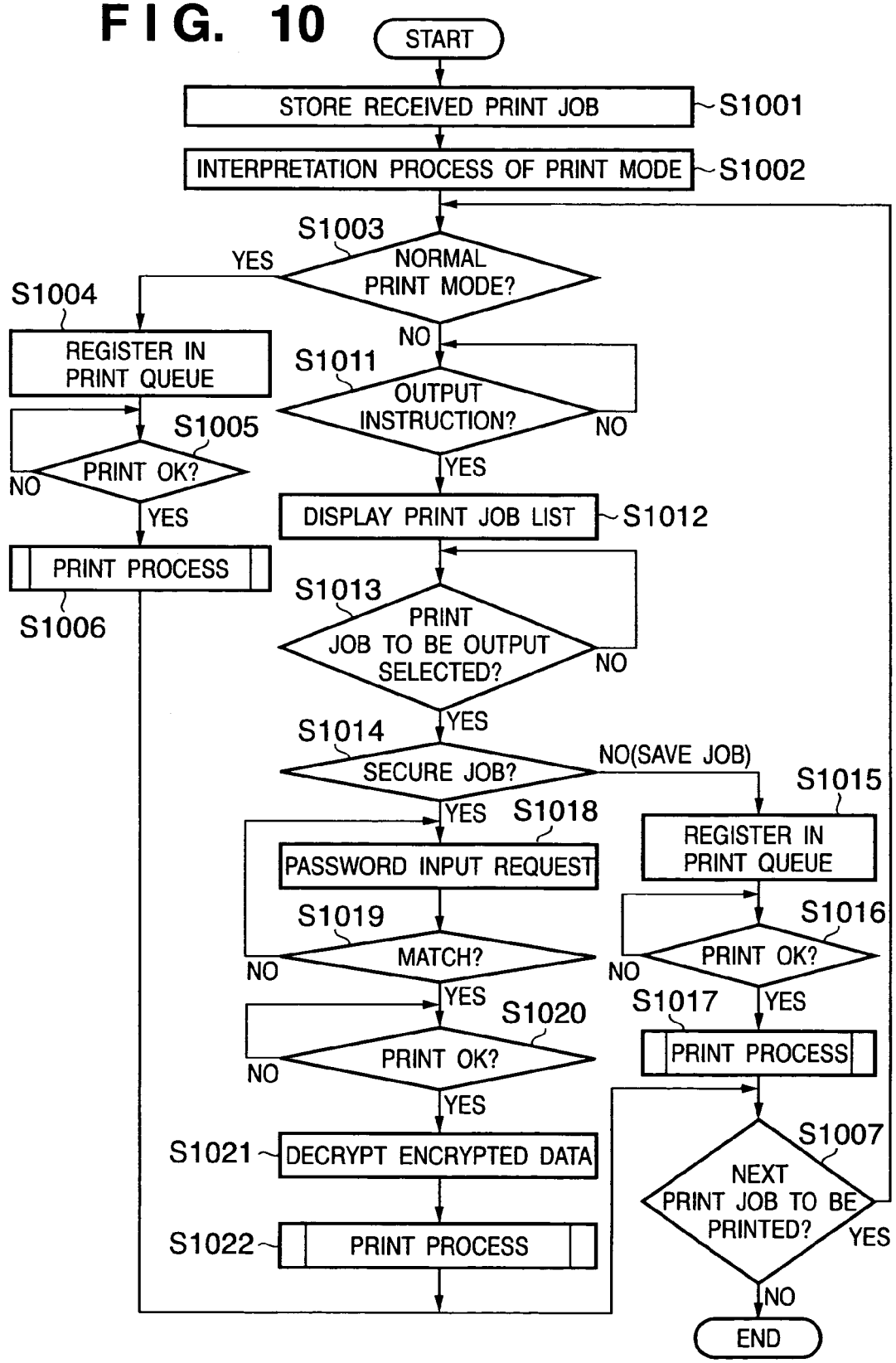
FIG. 10 is a flowchart showing an example of the process to be executed by a print apparatus of this system.

FIG. 10 is a flowchart of the print process according to this embodiment, which is executed by the print apparatus (104, 105, or the like) of this print system. Note that a program according to the flowchart of FIG. 10 is saved in the hard disk 1203 or ROM 1202 and is read out onto the RAM 1204 as needed, and the control unit (e.g., the CPU 1201) of this print apparatus or another unit executes this program, thus allowing the print apparatus according to this embodiment to execute the print process to be described below.

The control unit (e.g., the CPU 1201) of the print apparatus temporarily stores an incoming print job (including appended header information) in a predetermined area in the hard disk 1203 as an example of the storage unit (step S1001). Note that data of the print job may be stored in the image storage unit 1212 together with header information. However, if the image storage unit 1212 is a storage area in the hard disk 1203, the hard disk 1203 and the image storage unit 1212 indicate the same storage location.

The CPU 1201 interprets the print mode included in the header information appended to the print job to determine which of the three print modes this print job has (step S1002). The CPU 1201 determines based on the interpretation result in step S1002 if this print job is to be processed in "normal print mode" (step S1003).

If the CPU 1201 determines in step S1003 that the print job of interest is to be printed in "normal print mode" (for example, a job for which the user has selected "print" from the menu 501 shown in the window example of FIG. 5) (YES in step S1003), it advances the process to step S1004 and controls to execute a process for enqueuing data of this print job and header information appended to this print job in a print queue managed in the hard disk 1203 (step S1004).

The CPU 1201 schedules print jobs enqueued in this print queue so as to print them in the order they are enqueued. If a print turn of a given print job enqueued in this queue in step S1004 is reached (step S1005), the CPU 1201 controls the image processing unit 1213 to apply appropriate processes (processes based on output processing conditions set by the user via various user interface windows in FIGS. 3 and 4 by user operations) to data to be printed included in this print job so as to obtain a suited output result, and controls the printing device (also called a printer unit) 1211 to print the data of that print job in accordance with the print conditions which are included in the print job and are set by the user (step S1006). Details of the print process in step S1006 will be described later.

On the other hand, if the CPU 1201 determines in the interpretation process in step S1002 that the print mode of the received print job is not the normal print mode but is either of the secure print mode or save mode (NO in step S1003), it advances the process from step S1003 to step S1011.

For example, a job for which the user has selected "secure print" from the menu 501 on the operation window of the operation unit on the PC side shown in FIG. 5 is determined as that of the secure print mode. On the other hand, a job for which the user has selected "save" from the menu 501 on the operation window of the operation unit on the PC side shown in FIG. 5 is determined as that of the save mode. In case of such job, the CPU 1201 controls to advance the process to step S1011 as a process for that job.

The CPU 1201 checks based on detection information of a touch sensor or the like that detects various user's key operations at the control panel 1207 in step S1011 if the user inputs a print instruction (strictly speaking, the user instruction for controlling the printer unit 1211 of this print apparatus to execute the print process of data of the print job held in the hard disk 1203 of this print apparatus) using the user interface unit such as the control panel 1207 or the like of the print apparatus (step S1011). For example, the CPU 1201 displays an operation window with a "print job held in memory" key 1206a (FIG. 11A) on the display unit 1206 of the control panel 1207. If the user has pressed the key 1206a, the CPU 1201 determines that the output instruction has been made, and advances the process to step S1012. If the user has input the print instruction via the control panel 1207 of this print apparatus upon depression of the key 1206a in step S1011, the CPU 1201 displays an operation window that expresses a list of information pertaining to print jobs held in the hard disk 1203 (FIG. 11B) on the display unit 1206 of the control panel 1207 (step S1012).

Figure 11A:
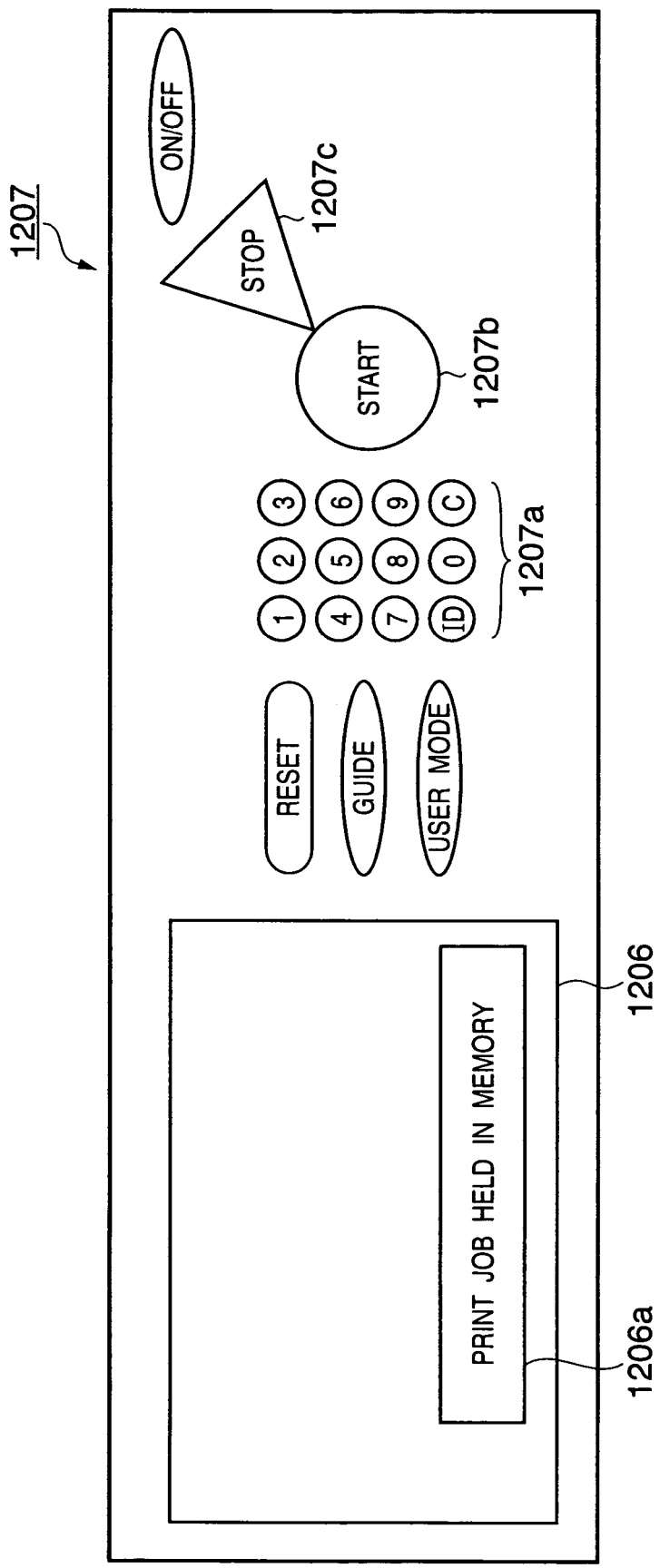
FIG. 11A is a view for explaining control for a display unit on a control panel of the print apparatus of this system.
Figure 11B:
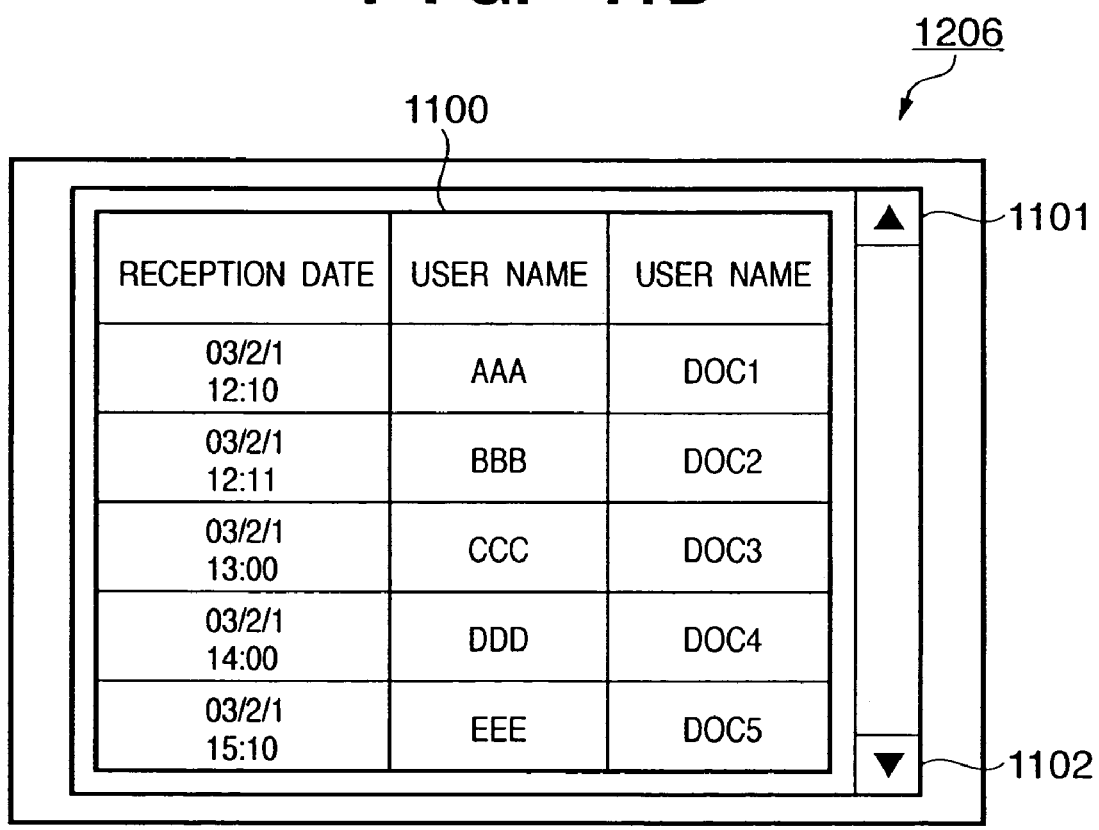
FIG. 11B is a view for explaining control for the display unit on the control panel of the print apparatus of this system.

FIGS. 11A and 11B show a display example of a print job list, which is displayed on the display screen of the display unit 1206 of the print apparatus in step S1012 under the control of the CPU 1201 of this print apparatus.

Referring to FIG. 11B, reference numeral 1100 denotes an area for displaying a print job list. As shown in FIG. 11B, a plurality of pieces of information ("reception date", "user name", "document "name") associated with print jobs enqueued in the print queue can be displayed on the area 1100.

When a plurality of pieces of information associated with all print jobs cannot be displayed within this area 1100, button icons 1101 and 1102 used to scroll the list displayed in the area 1100 upward and downward are provided on the identical window.

Reference numeral 1101 denotes a button icon used to scroll the list displayed within the area 1100 upward; and 1102, a button icon used to scroll the list displayed within the area 1100 downward. Respective pieces of information included in print jobs are displayed within the area 1100 in the order print jobs are enqueued in the print queue (in the order they are received by the print apparatus). In the example shown in FIG. 11B, the reception date, the user name who submitted the print job, and the file name of print data included in that print job are displayed. However, information to be displayed is not limited to such specific information.

In this embodiment, the CPU 1201 includes a timer (not shown) which measures the date and time. If the print apparatus receives a print job, its reception date is measured by this timer. Therefore, the measured reception date of each print job is displayed on the area 1100.

Likewise, the user name and document name displayed on this area are included in a print job when the print job generation source such as the PC or the like creates the print job. In this way, the print job that includes information associated with the source apparatus and user is submitted, and the included information can be displayed.

The user can designate a print job to be printed from the job list displayed within this area 1100 on the display screen using the control panel 1207. If the display unit 1206 is of touch panel type, the control panel 1207 corresponds to this touch panel. In this case, the user designates a print job to be printed using his or her finger, a designation tool, or the like on the display screen (area 1100), and a touch sensor (not shown) detects depression of the touch panel key and transmits it to the CPU 1201. Then, the CPU 1201 confirms a job selected by the user.

After the user has designated a print job to be printed, the CPU 1201 advances the process from step S1013 to step S1014 in response to this operation, and checks based on the user's setup condition information corresponding to that print job if the print mode of the designated print job is the secure print mode (step S1014). That is, the CPU 1201 can attain this checking process by referring to the print mode included in the header information, which is created on the basis of user's setups and is appended to the designated print job.

If the CPU 1201 determines as a result of the checking process in step S1014 that the print mode of the designated print job is not the secure print mode, i.e., the save mode, it advances the process to step S1015. For example, if the print job, which is selected by the user from the job list window (FIG. 11B) displayed on the display unit 1206, is a print job for which the user has designated "save" from the menu 501 on the operation window shown in FIG. 5 in advance on the PC 102 side, the CPU 1201 advances the process from step S1014 to step S1015. Note that the print job whose print mode is the save mode will be referred to as a "save job" hereinafter. Upon reading out a print job corresponding to this save job from the hard disk 1203 and controlling the printer unit to print it, the CPU 1201 inhibits execution of a series of authentication processes including an input request process of authentication data to the user via the control panel 1207 and an authentication data checking process for checking if the input authentication data is authentic. Then, the CPU 1201 controls to permit to read out the data of the save job selected by the user from the job list window displayed on the display unit 1206 of the print apparatus shown in FIGS. 11A and 11B from the hard disk 1203 in response to the user's print request instruction from the control panel 1207 and to print it by the print unit 1212. More specifically, by contrast to a display control example upon starting the print process of a secure print job (to be described later), when the print process of the save job selected via the operation window in FIG. 11B is to be started, the CPU 1201 controls the printer unit 1211 to start the print process of the save job without displaying any password input request window (FIG. 13A) on the display unit 1206, and also executes display control of the control panel 1207.

In step S1015, the CPU 1201 enqueues the save job in the print queue in the hard disk 1203 in the same manner as in the process in step S1004. If the print turn is reached (step S1016), the CPU 1201 controls the image processing unit 1213 to apply appropriate processes to data to be printed included in this print job so as to obtain a suited output result, and controls the printing device 1211 to print that data in accordance with the print conditions (those which are set by the user on the print setup windows shown in FIGS. 3 and 4) included in the print job (step S1017). Details of the print process in step S1017 will be described later.

On the other hand, if the CPU 1201 determines as a result of the checking process in step S1014 that the print mode of the print job is the secure print mode (corresponding to a print job for which the user has designated "secure print" from the menu 501 on the operation window in FIG. 5 in this example), it advances the process to step S1018. Note that a print job whose print mode is the secure print mode will be referred to as a "secure job" hereinafter. Upon reading out a print job corresponding to this secure job and controlling the printer unit to print it, the CPU 1201 requests and executes the authentication processes, and controls the print unit to print that job.

In step S1018, the CPU 1201 displays, on the display unit 1206, a GUI (e.g., an operation window shown in FIG. 13A) that prompts the user to input a password via the display unit 1206 as the user interface unit of this print apparatus (104 or 105) as an authentication process (step S1018).

The CPU 1201 controls to permit start of execution of a print process of print data of the secure print job under the condition that a password, which matches a password (corresponding to a password that has already been input by the user via the designation field 803 of the password setup window in FIG. 8 displayed on the operation unit of the PC upon inputting the print job in this example) set in advance by the user for the secure print job to be processed (the secure print job selected via the job list window in FIG. 11B in this example) is input via the operation window (e.g., that shown in FIG. 13A) displayed on the display unit 1206 of the print apparatus.

On the other hand, if a password different from the password which is set in advance for the secure print job to be processed is input via the operation window displayed on the display unit 1206 of the print apparatus, or if the user does not make any password input action via the user interface of the print apparatus, the CPU 1201 controls to inhibit execution start of the print process of print data of the secure print job.

Figure 13A:
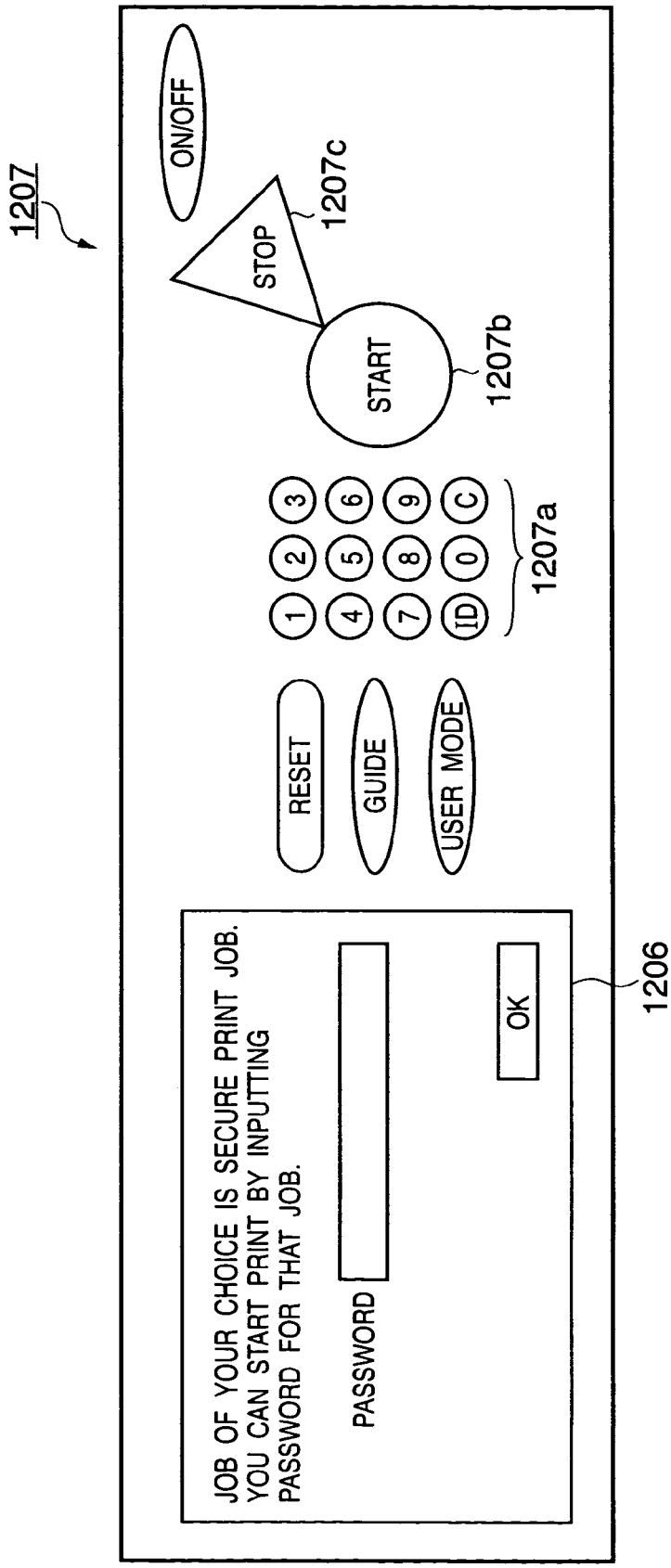
FIG. 13A is a view for explaining control for the display unit on the control panel of the print apparatus of this system.

In order to implement the aforementioned control, the CPU 1201 displays an operation window shown in, e.g., FIG. 13A on the display unit 1206 of the control panel 1207 in step S1018. As shown in FIG. 13A, the CPU 1201 controls to display an operation window which has a display area that notifies the user of guidance information (e.g., the job selected by the user on the job list window shown in FIG. 11B is a secure print job and the user must input password for that job to start the print process of the secure print job), and also an operation instruction field for prompting the user to input the password of that job. The CPU 1201 controls the print apparatus to wait for the user input of the password for the secure print job to be processed using, e.g., a ten-key pad 1207*a* of the control panel 1207 as the user interface unit of the print apparatus. If the user has made the password input operation at the control panel of the print apparatus in step S1018 (e.g., if the user has input the password on the operation window in FIG. 13A using the ten-key pad 1207*a* and has pressed an "OK" key on that window), the CPU 1201 checks if that password is authentic (step S1019).

If the CPU 1201 confirms that the password input by the user via the operation window shown in FIG. 13A matches that included in the header information appended to the secure job (i.e., the password input in the field 803 on the GUI shown in FIG. 8) (YES in step S1019), it advances the process to step S1020. The CPU 1201 confirms by checking data indicating the operation status transferred from the printer unit 1211 in step S1020 if the printer unit 1211 can start a print process. If the print process of another print job is already in progress by the printer unit 1211, the start of the print process of the secure print job is waited in step S1020. If it is determined under such job scheduling control that the print turn of the secure print job is reached (YES in step S1020), the CPU 1201 advances the process to step S1021, and controls the image processing unit 1213 to decrypt print data of the encrypted secure print job (step S1021). After the print data of the secure print job is decrypted in step S1021, the CPU 1201 controls the image processing unit 1213 to apply appropriate processes to image data of the decrypted secure print job under the processing conditions set by the user, and controls the printing device (printer unit) 1211 to print that job in accordance with the print conditions (those which are set by the user on the PC side using the windows in FIGS. 3 and 4) included in the secure print job (step S1022).

Upon completion of the print process in any of steps S1006, S1022, and S1017 in accordance with the designated print mode (normal print mode, save mode, or secure print mode), the CPU 1201 advances the process to step S1007. If print jobs still remain in the print queue, the CPU 1201 returns the process to step S1003 and controls to repeat the aforementioned processes. On the other hand, if no print job remains in the print queue (if there is no print job to be printed), the CPU 1201 ends this process.

The user operations at the control panel 1207 upon printing a secure job may be made in the following order: the user selects a job to be printed, and if that print job is a secure job, the CPU then requests to input authentication data such as a password or the like. However, this embodiment is not limited to such specific operations. For example, the CPU may prompt the user who wants to print a secure job to input authentication data, and if the number of secure jobs whose authentication data match is one, it may control to permit the print process of that secure job. If there are a plurality of secure jobs corresponding to authentication data that match the input authentication data, the CPU 1201 may present these secure jobs via the control panel 1207, may make the user select a desired secure job from them, and may control to print the secure job selected from the plurality of secure jobs. In this manner, this embodiment can adopt every operation procedures as long as the user can select a job of his or her choice.

The print process in steps S1006, S1022, and S1017 will be described below using FIG. 14 as the flowchart that shows details of the print process.

As described above, the CPU 1201 makes job scheduling to sequentially process jobs set in the print queue in the hard disk 1203 in their entry order in the queue. The CPU 1201 reads out a print job whose print turn is reached from the hard disk 1203, controls the image processing unit 1213 to appropriate processes (processes according to the processing conditions set by the user for that job to be printed) so as to obtain a suited print result of data to be printed included in the print job, and controls the printing device 1211 to execute a print process according to the print conditions included in the print job (step S1401). In this embodiment, a secure print job is held in the hard disk 1203 as encrypted data without being enqueued in the print queue, and is read out from the hard disk 1203 immediately before the printer unit is ready to print that job. Image data of the readout job is decrypted, and is printed by the printer unit 1211.

The CPU 1201 monitors and checks based on report information, and the like generated by various kinds of detection units (including various sensors that can detect interrupt factors of a print process in the print processing step such as a sensor for detecting the convey state of print sheets in a print sheet convey unit, expendable sensors including a sensor for detecting the presence/absence and/or the remaining amount of print sheets in a paper cassette, a sensor for detecting the presence/absence and/or the remaining amount of toner, and the like, and so forth), if a factor that interrupts the print process of a print job (print interrupt factor) occurs (or has occurred) during the print process of the print job executed by the printing device (printer unit) 1211. In this way, the CPU 1201 confirms the operation states of respective units while executing the print operation of a print job.

In this embodiment, error/alarm generation detection units are provided to respective units (the units shown in FIG. 12, or units which further form each of these units) that form the print apparatus. If any abnormality has occurred in the operation of each unit during the print process, an error signal corresponding to that unit can be sent to the CPU 1201 via an internal signal line. In this manner, the CPU 1201 can always check whether or not any abnormality has occurred in the operation of each unit.

Note that various print interrupt factors are assumed. In this embodiment, the print interrupt factors include at least any of a plurality of cases including a case wherein at least any (one or two or more) of expendables used for a job to be printed of a plurality of types of expendables including print media (e.g., paper sheets), staples, and toner are used up (first case), a case wherein an error has occurred as status of the print apparatus such as paper jam of a print sheet, staple jam of a stapler in a staple unit, memory full of a storage unit such as the hard disk 1203 or the like, document jam in a scanner unit if the apparatus has the copy function (second case), and a case wherein the operator inputs an interrupt instruction of the print process of the print job, which is in progress, via the control panel 1207 (third case). The CPU 1201 controls based on these print interrupt factors. However, this embodiment may include all of these cases or may adopt at least one of these cases as an interrupt factor. Of course, this embodiment can be applied to various other interrupt factors of the print process of a print job.

If the CPU 1201 detects one or more (at least one) of such print interrupt factors on the basis of information from the corresponding interrupt factor detection unit (aforementioned various sensors and the like), it determines that "a print interrupt factor has occurred".

If such print interrupt factor has not occurred, the CPU 1201 controls to continue the print process of the print job, which is in progress. Upon completion of the print process (step S1403), the CPU 1201 controls to delete the printed data of the print job from the print queue (step S1404), and to return the process to step S1007 in the flowchart shown in FIG. 10.

On the other hand, if any print interrupt factor has occurred, the CPU 1201 starts a process for interrupting the print process of the print job which is now in progress (for stopping the print process). In this case, the CPU 1201 advances the process to step S1405 to check with reference to the print mode included in the header appended to the print job if the print job designated by the print instruction (the print job whose print process is now in progress) is a secure job (step S1405).

If the CPU 1201 determines that this print job (the print job which is to undergo the interrupt process) is not a secure job (for example, if it determines that the print job which is to undergo the interrupt process is that of the normal print mode or save mode; i.e., if the print job which is to undergo the interrupt process is a non-secure print job), it advances the process to step S1406. In step S1406, the CPU 1201 controls the operations of concerned units to maintain the interrupt state of the print process until the print interrupt factor is removed (recovered) (steps S1406 and S1407).

After the CPU 1201 confirms based on information from sensors (not shown) of, e.g., respective units that the print interrupt factor has been removed (recovered) (YES in step S1407), it controls to return the process to step S1401 and to restart the print process of the print job that has been interrupted at the stage of step S1402 above from the interrupt timing of the print process at the stage of step S1402 above. For example, if the print operation has been interrupted during the print process of the third page of a job (non-secure print job) including five pages, the CPU 1201 controls the printer unit to automatically execute a job recovery process for, e.g., restarting the print process from the third page of that job in response to removal of the interrupt factor of the job. The CPU 1201 controls to repeat the subsequent processes so as to execute the print processes of the job through to the end.

Note that the CPU 1201 confirms by the following methods if the print interrupt factor has been removed. These methods will be exemplified below.

If the print process has been interrupted by, e.g., occurrence of an out-of-paper error in a paper feed unit, the CPU 1201 determines that the print interrupt factor has been removed when the user replenishes print sheets to the paper feed unit and the CPU 1201 receives from a sensor a message indicating that expendables are replenished (e.g., it receives a signal indicating that print sheets are replenished from a sensor that detects the sheet amount.

If the print process has been interrupted by, e.g., a print interrupt instruction of a print job input by the user from the user interface unit such as the operation unit of the PC 102, the control panel 1207 of the print apparatus, or the like, the CPU 1201 of the print apparatus determines that the print interrupt factor has been removed when a print restart instruction is input via the user interface unit such as the operation unit of the PC 102, the control panel 1207 of the print apparatus, or the like.

If the print process has been interrupted by, e.g., occurrence of a memory full error of the storage unit, the CPU 1201 of the print apparatus determines that the print interrupt factor has been removed under the condition that the user deletes a print job other than the print job which is to undergo the interrupt process in the storage unit and a free space is formed in the memory.

If the print apparatus has the copy function and a document scanner, and the print process has been interrupted by occurrence of document jam during execution of the print process of scanned document image data by the printer unit 1211 via the hard disk 1203 while scanning a document by the document scanner, the CPU 1201 of the print apparatus determines that the print interrupt factor has been removed when a jam sensor of the scanner detects that the user has removed a jammed document in the document feeder of the scanner.

If the print process has been interrupted by, e.g., occurrence of print sheet jam in a printer engine, the CPU 1201 of the print apparatus determines that the print interrupt factor has been removed in response to detection information from a paper jam sensor which confirms that the user has removed a jammed print sheet in the printer engine from the engine as a trigger. If the print process has been interrupted by, e.g., occurrence of staple jam in a staple unit of the print apparatus which can apply a staple process to print sheets, the CPU 1201 of the print apparatus determines that the print interrupt factor has been removed when it determines based on information from a sensor of the staple unit that the user has removed a jammed staple as a cause of that staple jam.

A plurality of examples have been explained. This embodiment can be applied to any other methods and arrangements as long as the control unit of the print apparatus can monitor the operation states of respective units parallel to the operations during execution of the print process of a print job and can confirm occurrence of a print interrupt factor that interrupts the print operation of that print job, can control to interrupt the print operation which is in progress in response to occurrence of that print interrupt factor, can confirm if the print interrupt factor has been removed, and can control to restart the print process of the print job whose print operation has been interrupted.

Figure 16:
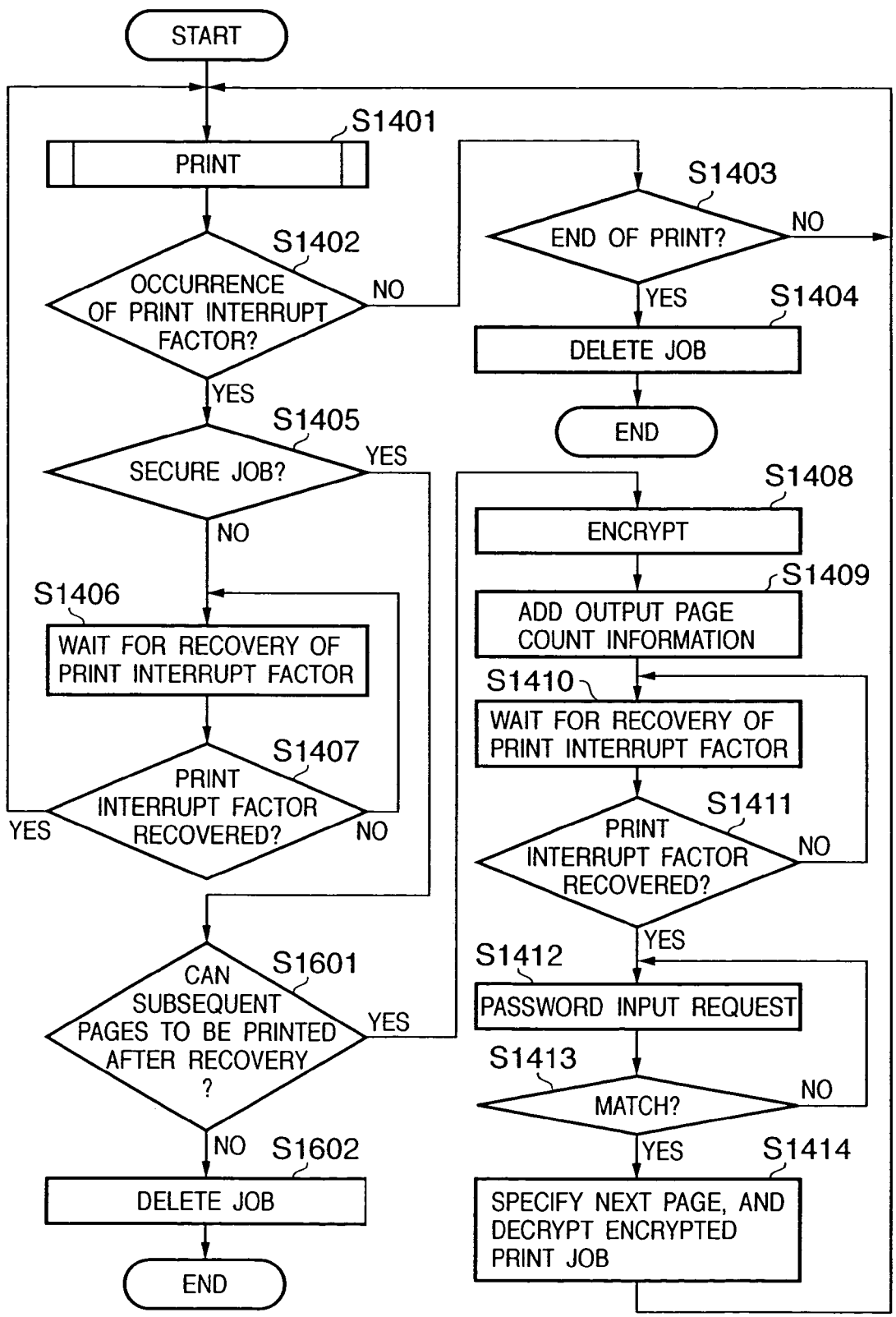
FIG. 16 is a flowchart of a print process according to the third embodiment of the present invention.

The description will revert to the description of the flowchart of FIG. 16. If the CPU 1201 determines in step S1405 that the print job designated by the print instruction (the print job which is to undergo the interrupt process) is a secure job (YES in step S1405), it advances the process to step S1408 and controls the image processing unit 1213 to encrypt image data of the print job that has already been processed from the encrypted state to the decrypted state in the previous stage (by the process in step S1021 in FIG. 10) again. Upon completion of the encryption process, the CPU 1201 controls to hold the encrypted image data in the hard disk 1203 (step S1408). Note that the process in step S1408 considers if the secure job may be held as non-encrypted data for a long period of time, and aims at further improvement of the security. Therefore, the process in step S1408 (or a process for encrypting the encrypted data in step S1414 to be described later) may be omitted. That is, as described above, since the authentication process is done at least in the secure print mode, high security can be assured. Hence, when this embodiment is applied to a print system which does not perform any encryption process in the secure print mode, the process in this step may be omitted. In this way, flexible specifications can be provided.

The CPU 1201 controls to append data associated with information required to specify the number of pages that have been printed so far in the print process of the secure job as encrypted data as in the real data to the print job (step S1409). For example, if an interrupt factor of a secure job, which is set by the user to print 10 copies of document data including 10 pages, has occurred during the print process of the second page of the third copy, and the print process of that job has been interrupted, the CPU 1201 controls to hold image data of the secure job including 10 pages as encrypted data, and to store, in the hard disk 1203, attribute information (job information) of that job including print processing condition data indicating that "the number of pages of that job is 10, the set paper size of a print sheet is an A4 size, and the number of copies is 3", print status data of the job indicating that "the print process is complete until the first page of the third copy", and the like as encrypted data in association with the image data of the job. Then, the CPU 1201 controls to maintain the interrupted state of the print process of the secure job until the print interrupt factor is removed (a detailed description of the interrupt factors and recovery conditions of the print process will be omitted since they are the same as those of the non-secure job) (steps S1410 and S1411).

If the CPU 1201 confirms based on an interrupt factor removal signal or the like from an interrupt factor removal detection unit (a remaining amount sensor, jam sensor or the like) that the print interrupt factor of the print job has been removed (recovered) (YES in step S1411), it advances the process to step S1412. The CPU 1201 requests the user to input the password, which was requested to the user via the control panel 1207 of the print apparatus in step S1018 above upon starting the print process of the secure job, via the control panel 1207 of the print apparatus again in step S1412.

If the user inputs the same password as that for the secure job, which was input by the user via the control panel 1207 of the print apparatus in step S1018 (corresponding to the password already registered by the user for that job via the field 803 of the setup window in FIG. 8), at the stage of step S1412 via the control panel 1207 of the print apparatus, the CPU 1201 controls to advance the process to step S1414. On the other hand, if the user does not input any password, which matches the password input by the user in step S1018 above to satisfy the print start condition (to determine YES in step S1019), via the control panel 1207 of the print apparatus at the stage of step S1413, the CPU 1201 inhibits the process from advancing to step S1414.

In the process in step S1414, the CPU 1201 reads out the image data of the secure job which is to undergo the interrupt process, and the job information of the secure job, which are held in the hard disk 1203 as the encrypted data by the processes in steps S1408 and S1409, from the hard disk 1203, and controls the image processing unit 1213 to decrypt them. Upon completion of this process, the CPU 1201 controls to return the process to step S1401, and to restart the print operation of the secure job from the interrupt timing of the print operation by the printer unit 1211 using the decrypted image data of the secure job on the basis of the decrypted job information of the secure job.

For example, in case of the above example, the CPU 1201 confirms information which indicates that the secure job is a job including 10 pages and is set to print 10 copies on A4-size print sheets, and the print process is complete until the first page of the third copy upon interruption of the print process. Then, the CPU 1201 controls the hard disk 1203 and printer unit 1211 to restart the print operation of the secure job from the second page of the third copy on the basis of this information.

In step S1412 and subsequent steps, in order to avoid a problem that a third party other than the user who issued the print instruction or a specific third party to whom that user wants to keep confidential takes a look at or removes prints printed without authorization after restart since the print process is to be restarted as the print interrupt factor has been removed but the print job is a secure job, the CPU 1201 controls to execute a sequence (a second print job recovery sequence for a secure job) different from that of the job restart process after removal of the interrupt factor when the print job which is to undergo the interrupt process is a non-secure job (a first print job recovery sequence for a non-secure job), after the print interrupt factor of the secure job has been removed. The reason why such control is to be done will be explained below with reference to actual examples.

For example, when the print process has been interrupted by occurrence of, e.g., an out-of-paper error, a person who replenishes print sheets (a person who removes an interrupt factor) is not always the user of prints, the print process of which has been interrupted, and some other person may replenish print sheets. Such case often occurs in the network environment in, e.g., an office. For example, when the print process has been interrupted due to, e.g., occurrence of print paper jam, and the print apparatus is down, a person different from the owner of the print job as a cause of print sheet jam may often remove a jammed print sheet from that print apparatus. In this way, in an environment such as an office environment or the like in which a single print apparatus is shared by a plurality of users, when the print process has been interrupted, an operator different from the owner of the print job which is to undergo the interrupt process may often remove (recover) the interrupt factor of the print process in the print apparatus.

Therefore, if a print restart process (also called a job recovery process) is allowed to be executed in the same manner as a print job of the non-secure print mode (i.e., uniformly, irrespective of a secure job or non-secure job), although the print process of a print job is started while maintaining high security via an authentication process and the like in the secure print mode, if the aforementioned case has occurred, a third party (e.g., a user who has removed the interrupt factor and is different from the owner of the secure job) may look at or may inadvertently take away print results printed by the print restart process at that time (at the restart timing of the print process after the interrupt factor of the print process has been removed). Hence, it becomes difficult to maintain and assure the security of a secure job whose print process is to be restarted in the same manner as the original security at the beginning of the print process.

Thus, in this embodiment, even when the print process of a secure job of non-secure and secure jobs is restarted, its security can be assured in various processes such as processes in step S1412 and subsequent steps and the like under the control of the CPU 1201 so as to maintain high security. For example, when the print process has been interrupted by occurrence of an interrupt factor in the print apparatus, and it is detected that the interrupt factor has been removed in the print apparatus, if a print job, the print process of which is to be restarted (to undergo a job recovery process), is a secure job, the CPU 1201 controls to display an operation window shown in, e.g., FIG. 13B on the display unit 1206 of the control panel 1207 of the print apparatus so as to prompt the user to input authentication data (password in this example) which has already been input by the user in the process in step S1018 above at the stage of step S1412 (i.e., at the timing at which the print interrupt factor has been removed, and the apparatus is ready to restart the print operation of the print job, which has been interrupted) (step S1412). The password to be input is the password input to the field 803 on the GUI shown in FIG. 8 (authentication data which was set and registered by the user upon inputting a print job in step S206 in FIG. 2), and is authentication data which was input via the control panel 1207 at the beginning of the print process in step S1018 (corresponding to the password input via the operation window shown in FIG. 13A in this example). That is, the CPU 1201 controls to prompt the user to input the same authentication data as that which was input by the user again via the control panel 1207 of the print apparatus, when the apparatus is ready to restart the print operation of the secure job, upon permitting the start of the print operation of the secure job.

In this way, the CPU 1201 controls to permit execution of the restart process (recovery process of the secure job) which is done after removal of the interrupt factor of the print process of the secure job that required the authentication process upon starting the print process, under the condition that the authentication process is executed again, and appropriate authentication data which is the same as that at the beginning of the print process is re-input in the recovery process.

Of course, if the user does not input the same authentication data as that at the beginning of the print process, the CPU 1201 controls to inhibit execution of the print restart process of the secure job whose print process has been interrupted, and to continuously store and hold that job even after the interrupt factor has been removed and to maintain that state until authentication data for that secure job is input after removal of the interrupt factor.

In this embodiment, if the authentication process is redone upon job recovery irrespective of the types of jobs (as well as a re-input request process of authentication data), the print process of even a non-secure job cannot be restarted. As a result, such specification may cause problems for the owners of non-secure jobs or may reduce the productivity of the overall system.

Hence, as described above, in the job recovery process of a non-secure job, the aforementioned authentication process is inhibited from being executed, and the print process is controlled to be automatically restarted in response to removal of an interrupt factor.

In this way, this embodiment focuses attention on, copes with, and considers both secure and non-secure jobs. For this purpose, when the print process of a print job, whose print process has been interrupted due to occurrence of a print interrupt factor is to be restarted (to undergo a job recovery process) after removal of the interrupt factor, the CPU 1201 controls to allow to restart the print process of the print job after re-execution of the authentication process if the print job is the secure print job, and to allow to restart the print process of the print without execution of the authentication process if the print job is the non-secure print job.

In this manner, various needs from users and various use environments in offices can be coped with. Hence, both the improvement of the operability for a non-secure job and maintenance of high security for a secure job upon restarting the interrupted print process can be achieved as one large major effect of this embodiment.

As described above, according to this embodiment, the CPU 1201 principally controls to process a plurality of print jobs including a secure print job that requires the authentication process before the beginning of its print process (e.g., a print job of the secure print mode which is set by the user by selecting "secure print" via the menu 501 on the operation window of FIG. 5; a job of such type will also be referred to as a print job of a first type), and a non-secure print job which does not require any authentication process before the beginning of its print process (e.g., a print job of the normal print mode which is set by the user by selecting "print" via the menu 501 on the operation window of FIG. 5 or a print job of the save mode which is set by the user by selecting "save" via the menu 501 on the operation window of FIG. 5; a job of such type will also be referred to as a print job of a second type).

Upon printing a secure print job that requires the authentication process, the CPU 1201 controls to request the user to input authentication data by displaying, e.g., the operation window that allows the user to input authentication data for the secure print job before the beginning of the print operation. When the user inputs the authentication data via the control panel 1207 in response to the input request of the authentication data, the CPU 1201 controls the authentication processing unit 1214 to execute a comparison process between the input authentication data and authentication data which is set in advance for the secure job to be printed (authentication data that has already been input in the field 803 on the operation window in FIG. 8). The CPU 1201 controls the print apparatus to execute the authentication process of the secure job to be printed in advance immediately before the secure print job is to be printed. If it is determined in the comparison process that authentication data that matches the pre-set authentication data is input, the CPU 1201 controls to start (permit) the print process of the secure print job (see the flow of a series of processes at the beginning of the print process of a secure print job including the processes: YES in step S1014→step S1018→YES in step S1019→step S1020→step S1021→step S1022 in FIG. 10). If it is determined in the comparison process that the input authentication data does not match the pre-set authentication data (NO in step S1019 in FIG. 10), or if the user does not execute any input operation of authentication data via the control panel 1207, the CPU 1201 controls to inhibit start of the print process of the secure print job.

On the other hand, upon printing a non-secure job, the CPU 1201 inhibits the print apparatus from executing the authentication process including a series of processes such as an input request process of authentication data, a comparison process of the authentication data, and the like. Upon reception of a secure print job, the CPU 1201 sets the job in the print queue in the hard disk 1203 of the print apparatus. The CPU 1201 automatically reads out image data of the non-secure job from the hard disk 1203 when the print timing is reached based on job scheduling (upon completion of the print process of a preceding job registered earlier in the print queue), and controls the printer unit 1211 to start (permit) the print process under the print condition set by the user (see the flow of a series of processes at the beginning of a print job of the normal print mode as an example of a non-secure job including processes: YES in step S1003→step S1004→step S1005→step S1006 in FIG. 10; and see the flow of a series of processes at the beginning of a print job of the save mode as an example of a non-secure job including processes: NO in step S1014→step S1015→YES in step S1016→step S1017 in FIG. 10).

With this arrangement, the CPU 1201 monitors the operation state of the print apparatus on the basis of various kinds of sensor information sent from various sensors (including various error event sensors such as a document jam sensor, print sheet jam sensor, and the like, and various expendable sensors such as a print sheet remaining amount sensor, toner remaining amount sensor, and the like) of the print apparatus, parallel to execution of the print operation by the print apparatus (e.g., the process in step S1402 in FIG. 16). When the CPU 1201 detects based on the monitor results that the interrupt factor of the print operation has occurred, it controls the printer unit 1211 and the like to interrupt the print operation of the job whose print process is now in progress.

Figure 14:
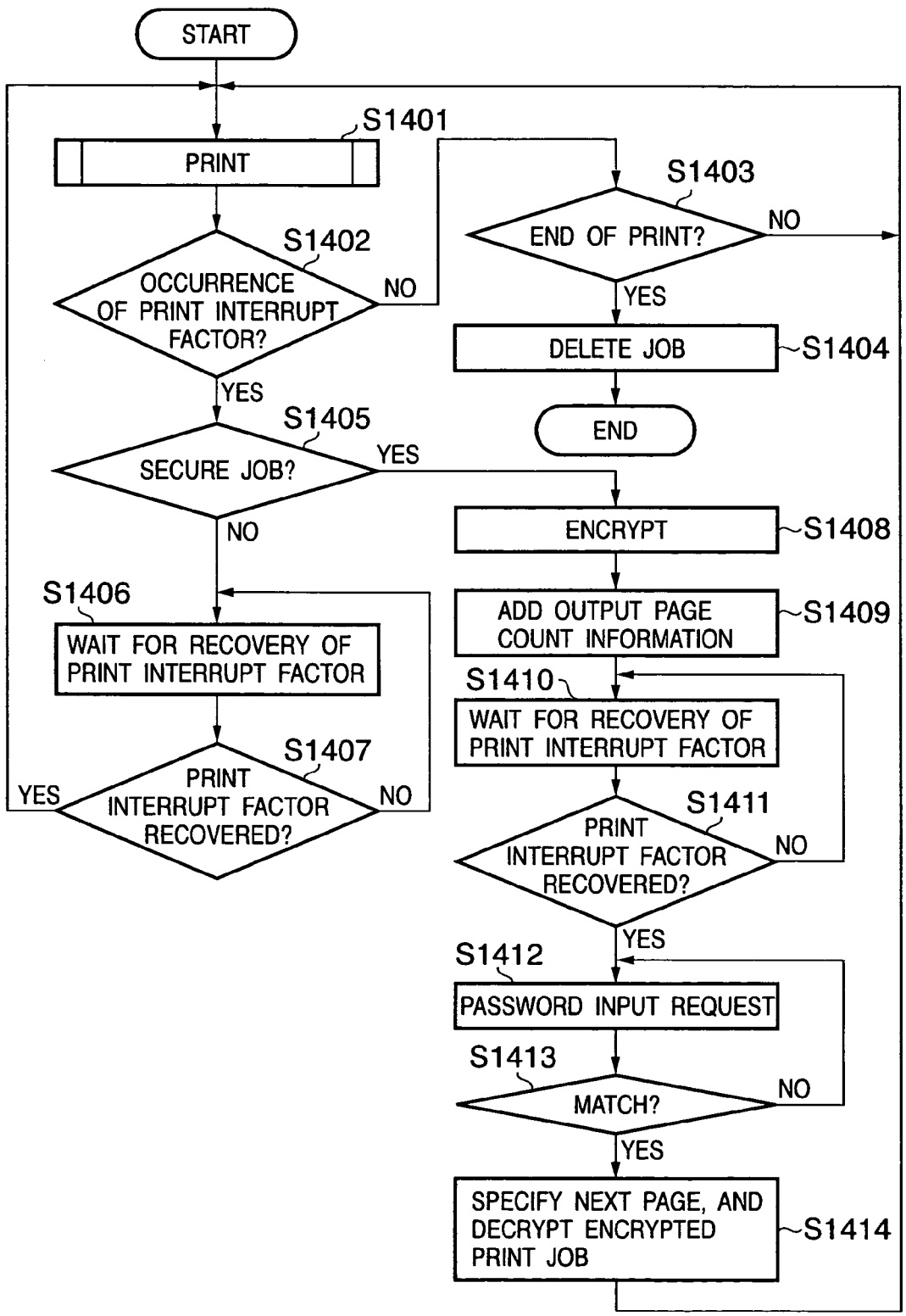
FIG. 14 is a flowchart showing an example of the process to be executed by the print apparatus of this system.

The CPU 1201 controls the print apparatus to maintain the print interrupted state until the print interrupt factor is removed (e.g., see the processes in steps S1407 and S1411 in FIG. 14). After the print interrupt factor has been removed, the CPU 1201 controls the hard disk 1203 and printer unit 1211 to restart the print operation of the print job which is to undergo the interrupt process from the interrupt timing of the print operation.

With the above arrangement, upon restarting the interrupted print process of the print job by occurrence of the print interrupt factor after the print interrupt factor has been removed, if the print job whose print process has been interrupted is the secure print job (print job of the first type) (e.g., YES in step S1405 in FIG. 14), the CPU 1201 controls to restart the print process of the print job (to permit restart of the print process of the secure print job) after the CPU 1201 controls the print apparatus to execute the authentication process, which was executed for the secure print job by the print apparatus, immediately before the beginning of the print process of the secure print job at a timing at least after occurrence of the print interrupt factor of the print job (at a timing at which the operator has removed the print interrupt factor in this embodiment) (e.g., see an example of the operation sequence that processes a secure job, the print process of which was started via the flow of a series of processes including processes: YES in step S1014→step S1018→YES in step S1019→step S1020→step S1021→step S1022 in FIG. 10, via the flow of a series of processes including processes: YES in step S1402→YES in step S1405→step S1408→step S1409→step S1410→YES in step S1411→step S1412→YES in step S1413→step S1414→step S1401 in FIG. 14). In this case, when the CPU 1201 determines that authentication data for the secure print job is re-input in the authentication process to be re-executed after removal of the print interrupt factor (e.g., YES in step S1413 in FIG. 14), it permits to restart the print process of the secure print job (see an operation control example that restarts the interrupted print process of the secure print job from a print page at the print interrupt timing by making transition: the process in step S1414→the process in step S1410 in FIG. 14). On the other hand, when the CPU 1201 determines that authentication data for the secure print job is not re-input via the control panel 1207 after occurrence of the job print interrupt factor (e.g., NO in step S1413 in FIG. 14), it inhibits the print process of the secure print job from restarting (e.g., see a control example that inhibits transition of the process to step S1414 in FIG. 14 to skip execution of the processes in step S1414 and subsequent steps).

In this way, when the CPU 1201 determines that the authentication process which was executed by the print apparatus immediately before the beginning the print process of the secure print job is not re-executed by the print apparatus at a timing after occurrence of the print interrupt factor of the job (at the removal timing of the print interrupt factor in this embodiment), it inhibits the print process of the secure print job from restarting even when it is detected that the print interrupt factor of the secure print job has been removed (recovered) by operator's intervention. As an example of that method, for example, like in this embodiment, when it is determined that authentication data which matches the authentication data input by the user operation via the control unit 1207 immediately before the beginning of the print process of the secure print job is not re-input after removal of the print interrupt factor of the secure print job (for example, when the re-input authentication data is inauthentic or when the user does not re-input authentication data via the control panel even after removal of the interrupt factor), the CPU 1201 controls to inhibit the print process of the secure print job from restarting.

On the other hand, when the print process of a print job, which has been interrupted due to occurrence of a print interrupt factor is to be restarted after removal of the print interrupt factor, and the print job is the non-secure print job, if the CPU 1201 determines that the print interrupt factor has been removed, on the basis of information from various sensors (remaining amount sensors for detecting the presence/absence and remaining amounts of expendables such as print sheets, toner, and the like, and error sensors for detecting presence/absence of errors such as document jam and the like) of the print apparatus, it controls to automatically restart the interrupted print process of the print job without executing any authentication process (by controlling the control panel 1207 and the like to inhibit the print apparatus from executing the input request process and collation process of authentication data). That is, the CPU 1201 permits to automatically restart the print process of the non-secure print job in response to removal of the print interrupt factor of the non-secure print job without any authentication process (e.g., see an example of an operation sequence for processing a non-secure print job, the print process of which was started via the process in step S1006 or S1017 in FIG. 10 and includes at least one of a print job of the normal print mode and that of the save mode by the flow of a series of processes: YES in step S1402→NO in step S1405→step S1406→YES in step S1407→step S1401 in FIG. 14).

With the above arrangement, occurrence of problems assumed in the prior art can be prevented, and high security of a job that requires a high security level such as a secure job or the like can be maintained even after removal of the print interrupt factor.

In addition, by executing the aforementioned selective control, the productivity of print jobs (non-secure print jobs such as a job of the normal print mode, that of the save mode, and the like) other than a secure job can be sufficiently taken into consideration. For example, a trouble that even when a given user has removed the interrupt factor of a non-secure print job with a security level lower than that of a secure print job, the print operation cannot be restarted unless the owner (user) of that job operates the print apparatus, and a problem that the number of print jobs that wait for print operations increases due to the aforementioned trouble and the productivity of the entire print apparatus system lowers can be avoided.

In this way, according to this embodiment, not only the design specification that need only maintain the security of a job which requires a high security level but also both the effect of maintaining high security of a print job that requires a high security level such as a secure job or the like, and the effect of improving the productivity (print efficiency) of a print job such as a non-secure job which is different from the secure job and includes at least one of a normal print job and save job can be achieved. Hence, a convenient apparatus and system can be provided, and a user environment of an optimal print system which can flexibly cope with various needs from various users can be built.

As described above, when the print apparatus has the copy function, the user can selectively set the normal print mode, save mode, and secure print for a print job of the copy function, which is scanned by the scanner unit of the print apparatus, and the CPU 1201 can apply the same job processing control as the aforementioned control.

For example, when a print job input via the scanner unit is a print job of the normal print job set by the user at the control panel 1207, the CPU 1201 controls the printer unit to directly print that job via the hard disk 1203 (or without the intervention of the storage unit). On the other hand, when a print job input via the scanner unit of the print apparatus is a print job of the save mode set at the control panel 1207, the CPU 1201 controls to temporarily hold that job in the hard disk 1203 in place of immediately printing it out, and to read out that job from the hard disk 1203 and to start the print process of the job by the printer unit upon reception of a print request instruction from the control panel 1207 (without requesting any authentication process). When a print job input via the scanner unit is a print job of the secure print mode set at the control panel 1207, the CPU 1201 temporarily holds that job in the hard disk 1203 in the same manner as in the save mode. However, upon storing that job in the hard disk 1203, the CPU 1201 makes the user register authentication data (e.g., password) of the job in advance via the control panel 1207. Upon executing the print process, if the CPU 1201 determines that appropriate authentication data is input via an authentication process such as a comparison process between the authentication data registered in advance, and that to be input by the user via the control panel 1207 upon printing or the like, it controls to read out data of the secure job from the hard disk 1203 and to start the print process by the printer unit. The CPU 1201 controls to execute processes after the beginning of the print processes of these print jobs in the same manner as those in the aforementioned flowcharts. In this way, when the print apparatus comprises the scanner, jobs from such scanner can be coped with.

As described above, this embodiment (including embodiments to be described later) can be applied to a print apparatus having at least any of a plurality of functions including the print function of controlling the printer unit 1211 to print a print job output from another device such as a computer or the like via the hard disk 1203, and the copy function of controlling the printer unit 1211 to print a print job output from the scanner unit via the hard disk 1203, and can also be applied to a single-function print apparatus (single-function peripheral) having only one of these functions and/or a multi-function print apparatus (multi-function peripheral) having a plurality of functions (e.g., the copy and print functions).

As described above, the aforementioned effects can be provided irrespective of whether a print job is that of the print function or copy function, thus obtaining another effect.

Figure 13B:
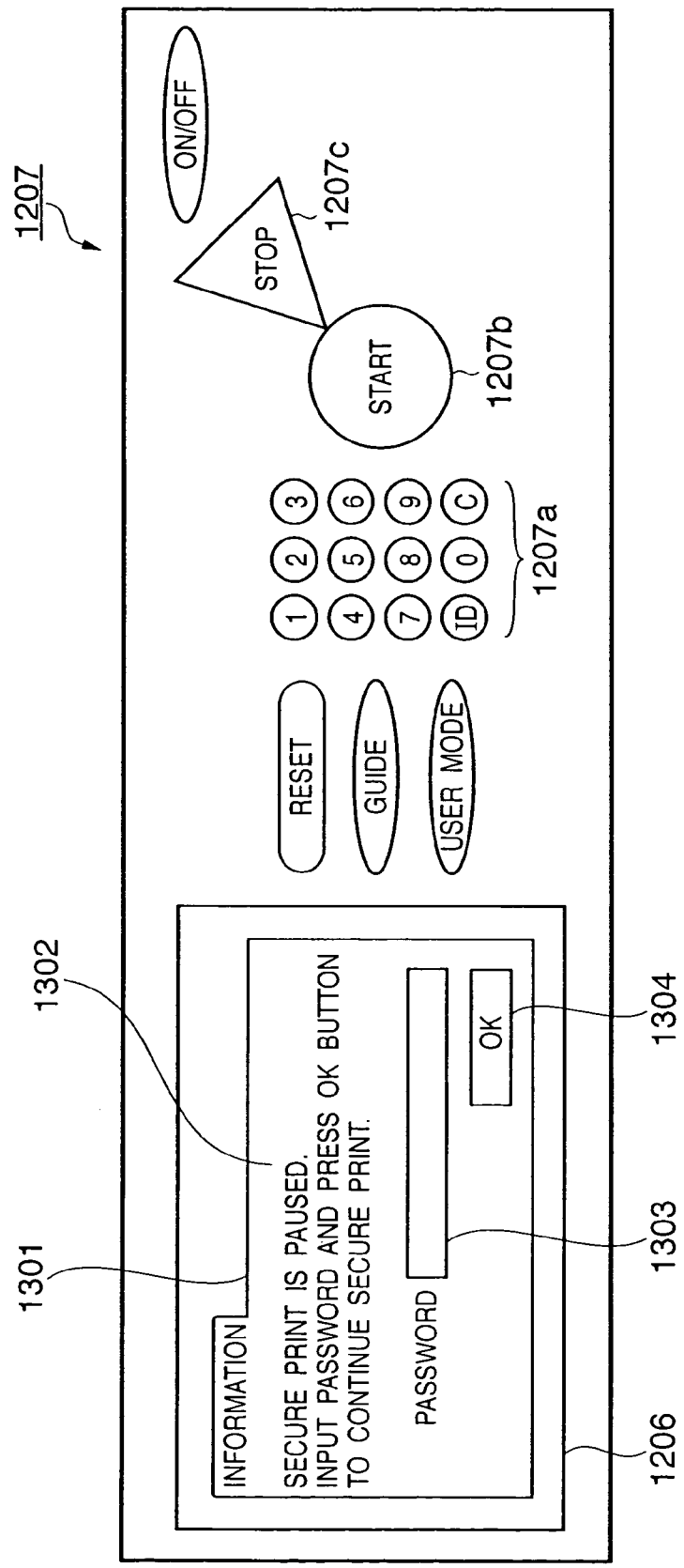
FIG. 13B is a view for explaining control for the display unit on the control panel of the print apparatus of this system.

FIG. 13B shows a display example of the GUI to be displayed on the display unit 1206 in step S1412 under the control of the CPU 1201. FIG. 13B shows the display unit 1206 and control panel 1207. Referring to FIG. 13B, the control panel 1207 includes a ten-key pad 1207a, copy start button 1207b, stop button 1207c, and the like.

The display unit 1206 displays a GUI 1301 which prompts the user to input a password to be input to restart the print process since the print interrupt factor has been removed. This GUI 1301 displays a message 1302 that prompts the user to input a password again, a field 1303 for inputting a password, and an "OK" button icon 1304 to be designated after the password is input. Hence, the user inputs a password using the ten-key pad 1207a included in the control panel 1207. The input password is displayed on the field 1303 as "*" to be hidden from everyone.

Note that buttons used to input print and copy control instructions such as the copy start button 1207b, stop button 1207c, and the like may be locked to be disabled during interruption of the print process.

Upon completion of the input of the password, if the user presses the "OK" button icon 1304, the CPU 1201 checks if the input password matches that included in the header information appended to the print job, whose print process is to be restarted (step S1413).

If the two passwords do not match, the CPU 1201 returns the process to step S1412 to prompt the user to re-input a password; if the two passwords match, the CPU 1201 advances the process to step S1414. In step S1414, the CPU 1201 specifies the next page to be printed with reference to information which is appended to the print job encrypted in step S1408 and indicates "the number of already printed pages), and controls the image processing unit 1213 to decrypt the print job encrypted in step S1408 (step S1414). The CPU 1201 returns the process to step S1401 to restart the print process, thus repeating the subsequent processes.

FIG. 15 shows an example of data indicating the print mode when the print mode is the secure print mode (secure job) as data indicating the print mode to be appended to print job data.

In this example, this print job data is formed of JobLanguage (JL) data and page description language (PDL) data as in general job data. By designating SECUREPRINT as JOBMODE in the fourth line, secure job data is set.

As described above, with the print process according to this embodiment, when the print process of a secure job has been interrupted by a print interrupt factor, it is not restarted unless a password is input even after the print interrupt factor has been removed. Hence, when the user who issued the print instruction or another user approved by that user (of course, this user knows a password required to print) is absent from the print apparatus, the secure job can be prevented from being printed. In this manner, the security associated with the print process of the secure job can be maintained.

In this embodiment, various kinds of control mentioned above are executed for the control panel 1207 with the display unit 1206, but the display configuration like the operation windows of this embodiment need not always be adopted. That is, this embodiment can be applied to any other user interfaces as long as they have both the function of executing notification processes of various kinds of information to the user, and the instruction function for accepting user's instructions.

As for the encryption and decryption processes in the above description, this embodiment is not limited to a specific algorithm as long as an algorithm as a pair of encryption and decryption is used.

In this embodiment, the password is input to a field formed on the GUI using the control panel 1207. The input pattern of the password is not limited to this. For example, the print apparatus may comprise a card reader, and a card stores this password. This card is inserted into the card reader which reads the password recorded on that card, thereby inputting the password to the print apparatus.

Second Embodiment

In the first embodiment, when the print process of a secure job has been interrupted by a print interrupt factor, that print job is encrypted and held, and the encrypted job data is decrypted by inputting a password so as to restart the print process. However, after encryption of a secure job, the print process of this secure job is interrupted, and a list display window of a print queue may be displayed to prompt the user to select a job to be printed. That is, if the password matches in step S1413, the CPU 1201 advances the process to step S1012.

As a merit, such embodiment can cope with a case wherein the security associated with a secure job is maintained, and the user wants to print earlier a print job which is to be printed after the secure job in the print queue since removal of the print interrupt factor.

Note that the process for encrypting a print job after print interruption is not indispensable. Also, encryption of a print job to be submitted to the print apparatus is not indispensable.

As described above, this embodiment devises variously to improve the job productivity of the entire system as well as it can maintain the security level of a job with a high security level even after the print operation is interrupted. Such further different control examples will be described below using FIGS. 17 and 18.

Figure 17:
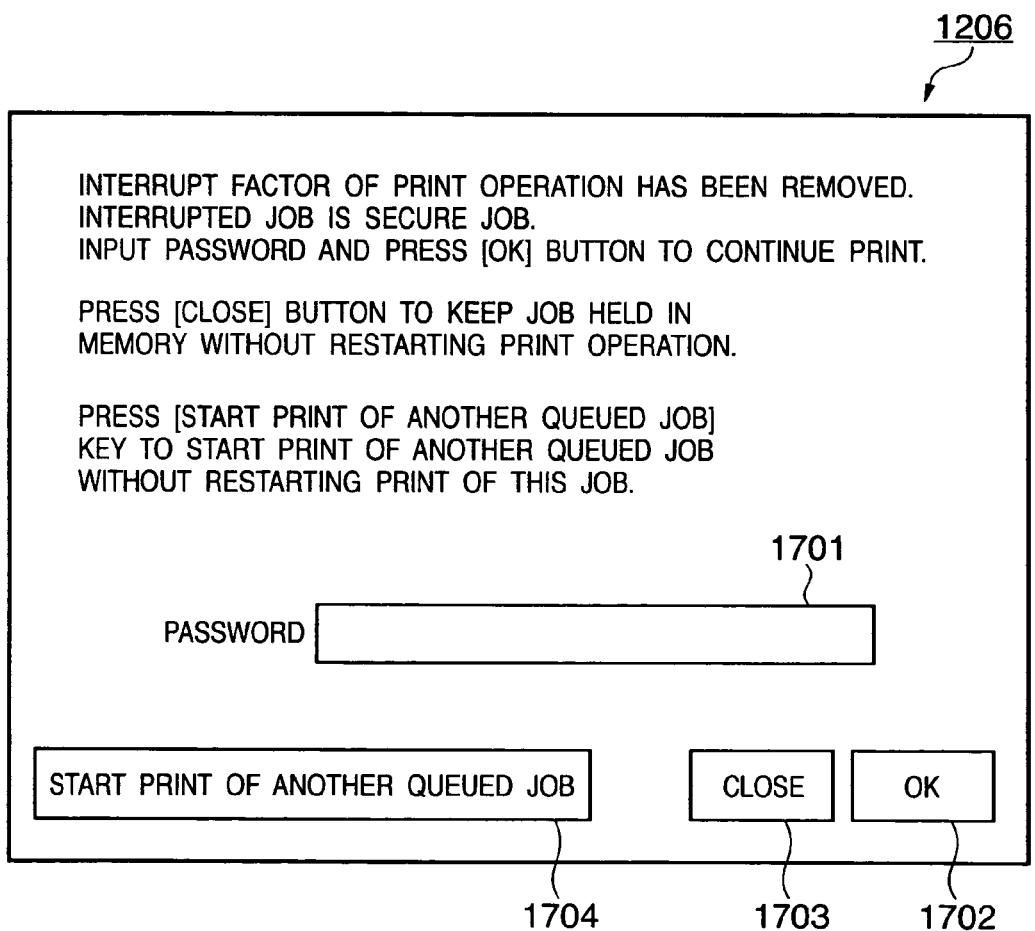
FIG. 17 is a view for explaining control for a display unit of a control panel of a print apparatus of a system.

Upon prompting the user to re-input authentication data of a secure job whose print process has been interrupted at the stage of step S1412 in FIG. 14, the CPU 1201 controls to display an operation window 1700 shown in FIG. 17 on the display unit 1206 of the print apparatus.

FIG. 17 shows an example of the operation window to be displayed on the display unit 1206 of the print apparatus by the CPU 1201 when the CPU 1201 determines that the interrupt factor of the print operation has been removed in the print apparatus (when the user has replenished expendables such as paper sheets and the like or has recovered an error), and that job is a secure print job (YES in step S1411).

The CPU 1201 controls to notify the user of various kinds of information by displaying, on the display unit 1206, the operation window 1700 which has a display area that displays information required to notify the user that the print interrupt state has been recovered and that the job whose print process has been interrupted is a secure job, and guidance information required to give a guidance about the next action to the user. The operation window 1700 has an instruction field 1701 used to prompt the user to re-input password data as an example of authentication data so as to restart the print operation of the secure job. In addition, the window 1700 has a "close" key 1703 which allows the user to input an instruction that inhibits the print operation of the secure job from restarting, and holds it in a memory in a locked (encrypted) state. Furthermore, the window 1700 has a "start print of another queued job" key 1704 which allows the user to input an instruction for preferentially starting execution of the print operation of another print job, which is different from the secure job whose print operation has been interrupted, and is queued in the print queue in the hard disk 1203 of this print apparatus, in place of restarting the interrupted print operation of the secure job.

The CPU 1201 controls to display, on the display unit 1206 of the print apparatus, the operation window 1700 which has the display area for displaying various messages and guidance to the user, and the instruction field 1701 and keys 1702 to 1704 that allow the user to selectively input various instructions at the aforementioned timing (i.e., at a timing at which the print interrupt factor of the secure job has been removed (recovered) by the print apparatus when it is determined that the print job whose print operation has been interrupted is a secure job).

After this window 1700 is displayed on the display unit 1206, when the user inputs the password using the ten-key pad on the control panel 1207 via the window 1700 and presses the OK key 1702, the CPU 1201 controls the authentication processing unit 1214 to execute the authentication process, i.e., to check if the input password matches the password for the secure job whose print process has been interrupted, in response to the user operation. If the CPU 1201 determines that the two passwords match, it reads out image and job information (print processing condition data and progress status data) of the secure job, which are held in the hard disk 1203 as encrypted data, from the hard disk 1203. The CPU 1201 controls the image processing unit 1212 to decrypt these data, and controls the printer unit 1211 to restart the print operation of the secure print job from the interrupt timing of the print job specified based on the job information using the decrypted information of the secure job.

On the other hand, after this window 1700 is displayed on the display unit 1206, when the user inputs the close key 1703 via the window 1700, the CPU 1201 controls to hold the encrypted image data and job information of the secure job in the hard disk 1203 and not to restart the print operation of the secure job at the present time (the removal timing of the print interrupt factor). In addition, upon executing this control, the CPU 1201 controls to return the process to step S1007 or S1001 in FIG. 10, and to wait for a print request of another print job. Furthermore, in order to cope with a case wherein the user of the secure job wants to restart its print operation later, the CPU 1201 controls to advance the process at least to step S1011 and to restart the print operation of the secure job using the image data and job information held in the hard disk 1203 in response to an instruction from the user of the secure job which is input via the window of FIG. 11 again.

After this window 1700 is displayed on the display unit 1206, when the user inputs the "start print of another queued job" key 1704 via the window 1700, the CPU 1201 controls to hold the encrypted image data and job information of the secure job in the hard disk 1203 and not to restart the print operation of the secure job at the present time (the removal timing of the print interrupt factor). In addition, upon executing this control, the CPU 1201 controls to advance the process to step S1007 in FIG. 10. In step S1007, the CPU 1201 reads out image data of another print job which is different from the secure job and is queued in the print queue in the hard disk 1203, and controls the printer unit 1201 to print image data of that job in accordance with the print conditions of the job so as to start the print operation of that print job.

When the interrupted print operation of the secure job is inhibited from being interrupted and the print operation of another queued job is started instead in response to depression of the key 1704 by the user, if it is determined that a plurality of print jobs are queued in the print queue in the hard disk 1203, the CPU 1201 controls to process first a job which was enqueued in the print queue earliest of the plurality of jobs. The CPU 1201 controls the hard disk 1203 and printer unit 1211 to process jobs in turn in the order in which the jobs are queued in the print queue, every time the print process of one print job is complete. That is, the CPU 1201 controls to dequeue and print a plurality of print queues that have already been enqueued in the print queue as much as possible during the restart inhibition period of the print operation of the secure job.

When another job is a secure print job, the CPU 1201 allows to advance the process to, e.g., step S1018 in FIG. 10 and controls to start the print process of that job by prompting the user to input its authentication data via the control panel 1207.

By executing the selective control based on the instruction (1701 to 1704) input by the user on the window 1700 in FIG. 17, the aforementioned effect (the effect that can achieve both the effect of maintaining the security of a secure job even after the print interrupt state of that job has been removed, and the effect of improving the productivity by preventing any productivity drop of jobs other than the secure job which is to undergo the print interrupt process) can be expected.

For example, the following troubles can be avoided: even though the print interrupt factor of a secure job has been removed and the print operation of the secure job can be restarted, if the owner of that secure job is not attending the print apparatus and cannot re-execute the authentication process of the secure job (if authentication data of the secure job cannot be re-input after the interrupt factor has been removed), the operation of the print apparatus is kept suspended for the aforementioned reason, and the productivity of the entire system drops due to an increase in the number of queued jobs since the print operations of other queued print jobs cannot be started, and so forth. In this way, the effect of improving the productivity of the entire system while maintaining the security of the secure job can be further improved.

In this embodiment, in order to further improve the above effect, the CPU 1201 also executes the following control in addition to the aforementioned control. For example, when the operation window 1700 shown in FIG. 17 is displayed on the display unit 1206 of the print apparatus in response to removal of the interrupt factor of the print operation of a secure job, if no user operation is made via the control panel 1207 of the print apparatus a predetermined period of time (e.g., 1 sec) elapsed after the display timing of the window 1700 on the display unit 1206, the CPU 1201 automatically controls to hold the encrypted image data and job information of the secure job in the hard disk 1203 and to inhibit the print operation of the secure job from restarting at the present timing (at the removal timing of the print interrupt factor).

In addition, the CPU 1201 automatically executes the aforementioned control, and automatically advances the process to step S1007 in, e.g., FIG. 10 without any user instruction via the window 1700. In step S1007, in order to start the print operation of another print job which is different from the secure job and is queued in the print queue in the hard disk 1203, the CPU 1201 reads out image data of the queued print job from the hard disk, and controls the printer unit 1211 to print the image of that job in accordance with the print conditions of the job. If no queued job is found, the CPU 1201 controls to advance the process to step S1001 in FIG. 1 to wait for reception of a new print job.

In this manner, when the CPU 1201 determines that no user instruction is input at the print apparatus via the window 1700 a predetermined period of time elapsed after the display timing of the window 1700 in FIG. 17 on the display unit 1206, it controls the print apparatus to automatically execute the same operation as that executed when the user presses the key 1704 or 1703 even when the user does not press the key 1704 or 1703.

With this arrangement, this embodiment not only can cope with a situation in that the user himself or herself of the secure job which is to undergo the print interrupt process is not in front of the print apparatus at the removal timing of the print interrupt factor, but also can provide the above effect even when both the user of the secure job and another user who inputs a queued job other than the secure job are not in front of the print apparatus (including a situation in that nobody is present), thus providing another effect.

Figure 18:
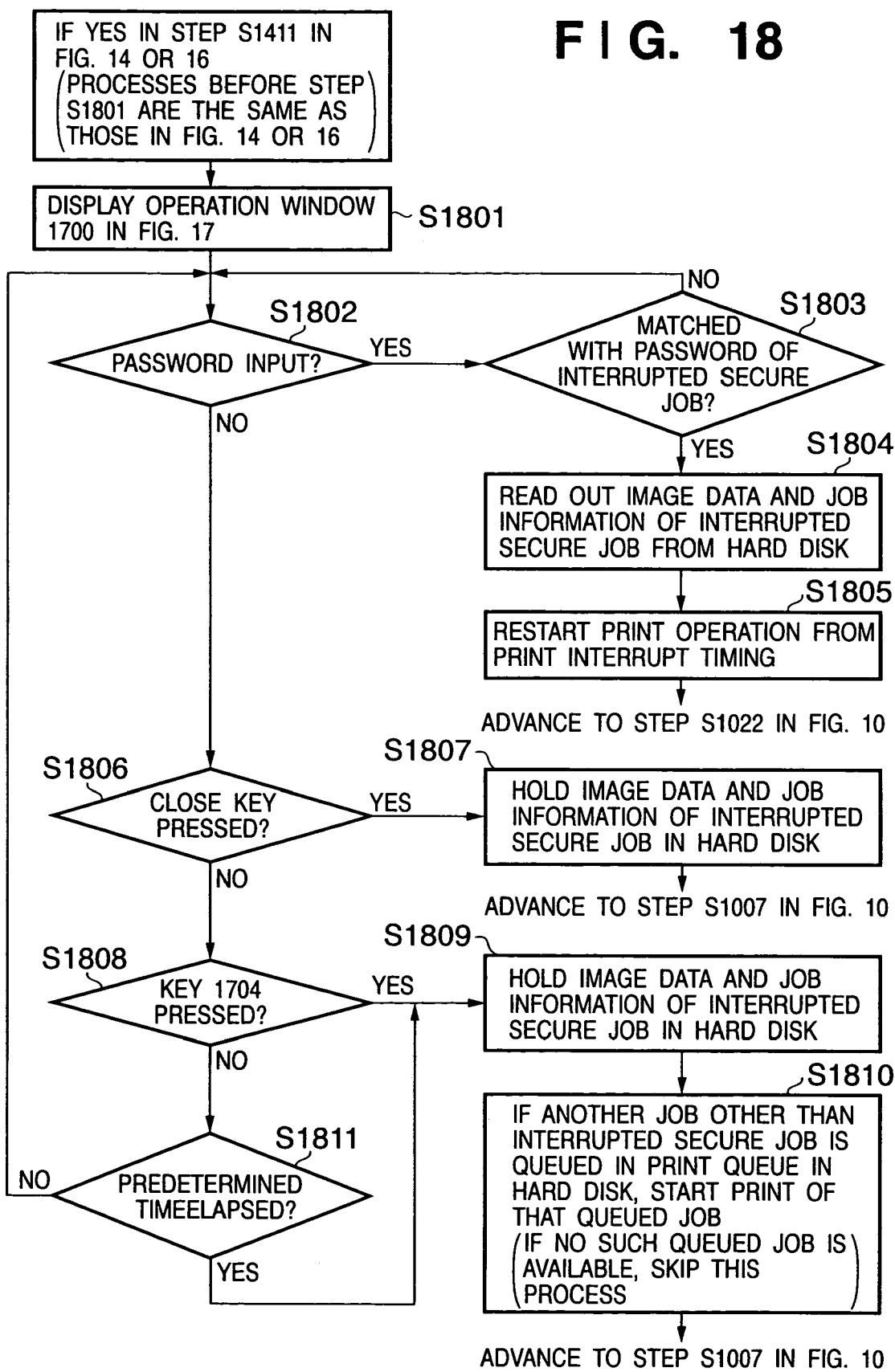
FIG. 18 is a flowchart for explaining job process control.

When the selective operation in the print apparatus in accordance with user's instructions is expressed using a flowchart, for example, the processing flow shown in FIG. 18 is to be executed.

FIG. 18 is a flowchart showing a series of processes to be executed by this print apparatus if YES is determined in the checking process in step S1411 in the flowchart shown in FIG. 16 (or in the flowchart shown in FIG. 16 to be described later).

More specifically, the CPU 1201 controls this print apparatus to such series of processes when the print operation of a given print job has been interrupted due to occurrence of any interrupt factor of the print operation of that job during execution of the print operation of the print job (if YES in step S1402), that print interrupt factor has been removed (recovered) by the print apparatus due to user's intervention (a user operation such as an expendable replenish operation, error cancel operation, or the like) (if YES in step S1411), and it is determined that the print job whose print operation has been interrupted is a secure print job (if YES in step S1405).

Since various processes executed by the CPU 1201 prior to those in the flowchart shown in FIG. 18 are the same as the processes in the flowchart of FIG. 14 or 16 (steps S1401 to S1410), a description thereof will be omitted.

If the CPU 1201 determines that the print operation of this print apparatus has been interrupted (if YES in step S1402 in FIG. 14 or 16), that the interrupt factor of that print operation has then been removed in the print apparatus (if YES in step S1411 in FIG. 14 or 16), and that the print job whose print operation has been interrupted is a secure print job (if YES in step S1405 in FIG. 14 or 16), it controls to display the operation window 1700 in FIG. 17 on the display unit 1602 of the print apparatus (step S1801). If the CPU 1201 determines that the print job whose print operation has been interrupted is a non-secure print job, it automatically advances the process to step S1401 in FIG. 14 without making the print apparatus execute the authentication process, and automatically controls to restart the print operation of that print job from the interrupt timing of the print operation (corresponding to the processing flow: NO in step S1405→step S1406→YES in step S1407→step S1401 in FIG. 14 or 16).

After the operation window 1700 in FIG. 17 is displayed on the display unit 1602 in step S1801, if the user inputs a password to the instruction field 1701 of the operation window 1700 via the ten-key pad and presses the OK key 1702 (YES in step S1802), the CPU 1201 checks if the password input by the user via the field 1701 matches the password which has already been registered by the user for the interrupt secure job as the current job of interest (the password that has already been registered upon inputting the job via the window of FIG. 8) (step S1803). Note that this process is basically the same as that in step S1413 in FIG. 14.

If NO in step S1803 (if it is determined that no correct password is input as a result of re-execution of the authentication process for the secure job after removal of the interrupt factor of the secure job), the CPU 1201 inhibits the interrupted print operation of the secure job from restarting even when the print interrupt factor of the secure job has been removed, and returns the process to step S1802.

On the other hand, if YES in step S1803 (it is determined that the correct password is input as a result of re-execution of the authentication process for the secure job after removal of the interrupt factor of the secure job) (YES in step S1803), the CPU 1201 permits to restart the interrupted print operation of the secure job after removal of the print interrupt factor of the secure job, and reads out image data and job information of the secure job from the hard disk (step S1804). If these readout data are encrypted data, the CPU 1201 controls the image processing unit 1213 to decrypt them, and controls the printer unit 1201 to restart the print operation of the secure job from the interrupt timing of the print operation in accordance with the print conditions of that job (step S1805). After that, the flow returns to step S1022 in FIG. 10.

If the CPU 1201 determines based on, e.g., sensor information from a touch sensor of the display unit 1602 in step S1802 that the user neither inputs any password nor presses the OK key 1702 via the window 1700 in FIG. 17, it checks based on the detection information from the touch sensor if the user has pressed the close key 1703 on the operation window 1700 (step S1806).

If the CPU 1201 determines in step S1806 that the user has pressed the key 1703 (YES in step S1806), it controls to inhibit the interrupted print operation of the secure job from restarting at the present time even after removal of the print interrupt factor of the secure job and to hold the image data and job information (print condition data and job progress information required to specify the progress state of execution of the print process) of the secure job whose print operation has been interrupted in the hard disk 1203 (step S1807). If these data are encrypted by, e.g., the process in step S1408 in FIG. 14, they are held in the hard disk 1203 as encrypted data, but need not always be encrypted in this embodiment. In any case, it is desirable to allow the print apparatus to restart the print operation of the secure job under the condition that the user of that job inputs the authentication data again via the control panel 1207. After execution of the process in step S1807, the CPU 1201 returns the process to step S1007 in FIG. 10 to wait for the print request of another print job.

If the CPU 1201 determines based on, e.g., information from the touch panel sensor in step S1806 that the user has not press the close key 1703 on the operation window 1700 (NO in step S1806), it checks based on sensor information from the touch panel sensor whether or not the user has pressed the "start print of another queued job" key 1704 on the operation window 1700 (step S1808).

If the CPU 1201 determines in step S1808 that the user has pressed the key 1704 (YES in step S1808), it controls to inhibit the interrupted print operation of the secure job from restarting at the present time even after removal of the print interrupt factor of the secure job and to hold the image data and job information (print condition data and job progress information required to specify the progress state of execution of the print process) of the secure job whose print operation has been interrupted in the hard disk 1203 (step S1809). If these data are encrypted by, e.g., the process in step S1408 in FIG. 14, they are held in the hard disk 1203 as encrypted data, but need not always be encrypted in this embodiment.

If YES in step S1808, the CPU 1201 executes the process in step S1809 and checks whether or not another job other than the secure job whose print operation has been interrupted is queued in the print queue in the hard disk 1203. If the CPU 1201 determines that another job is queued, it reads out image data and job information of the queued print job from the hard disk 1203 and controls the printer unit 1211 to start and execute the print process of that job in accordance with the image data and print condition data of the job (step S1810). More specifically, by executing the processes in steps S1809 and S1810, the CPU 1201 inhibits the interrupted print operation of the secure job from restarting at the present time, and controls to preferentially start and execute the print process of another print job queued in the hard disk 1203 instead. The CPU 1201 then advances the process to step S1007 in FIG. 10. If no print job is queued in the print queue in the hard disk 1203, the CPU 1201 skips the process in step S1810 and directly advances the process from step S1809 to step S1007 in FIG. 10. If a plurality of print jobs have been enqueued in the print queue in the hard disk, the CPU 1201 controls to process in turn these print jobs in the order in which they are enqueued in the print queue. A queued print job other than the secure job whose print process has been interrupted corresponds to a non-secure job including at least one of a job of the normal print mode and that of the save mode. The CPU 1201 controls to start the print process of such non-secure print job in step S1810. In case of the arrangement in which a secure print job can also be enqueued in the print queue, the CPU 1201 controls to be able to start the print process of another queued secure print job in place of restarting the print process of the secure job that has caused the interrupt factor. If the print process of another secure job is to be started in the process in step S1810, the CPU 1201 controls to start that print process under the condition that the authentication process for that job is executed. Therefore, if such authentication process is not done, the CPU 1201 controls to make job scheduling to put off the print process of that secure job, and to start and execute the print process of another queued non-secure print job in step S1810.

If the CPU 1201 determines in step S1808 that the user has not pressed the key 1704 (NO in step S1808), it checks if the user does not make any operation to this print apparatus from which the print interrupt factor of the interrupted secure job has been removed a predetermined period of time (e.g., 1 to 2 sec) elapsed after the display timing of the operation window 1700 on the display unit 1206 in step S1801 (step S1811).

An example of a situation in that no user operation is made at this print apparatus as information required to make a decision in step S1811 corresponds to, for example, a case wherein no user instruction is input via the window 1700 in FIG. 17. This decision is made based on detection information from, e.g., the touch panel sensor of the display unit 1206

(first example). Another situation corresponds to, for example, a case wherein no user instruction is input via the window 1700 and none of keys (so-called mechanical hardware keys of the control panel 1207 such as the ten-key pad 1207*a*, start key 1207*b*, stop key 1207*c*, reset key, guide key, user mode key, and the like shown in FIG. 13) other than software keys on the display unit 1206 of the control panel 1207 are operated (second example). In this case, the decision is made using information from a control panel sensor which detects depression of such hardware keys. Still another situation corresponds to, for example, a case wherein no use operations for any displayed keys are made via the window 1700 displayed on the display unit 1206, none of the mechanical hardware keys on the control panel 1207 other than software keys displayed on the display unit 1206 are operated, and no operations by the operator (e.g., an operation for setting a document on a document table by the operator, an operation for opening/closing a paper cassette, an operation for opening/closing the front or side cover of the print apparatus, or the like are executed for various units (at least any of the option units such as the scanner unit, printer unit, finisher, and the like) other than the control panel 1207 of this print apparatus (third example). Upon making this decision, the CPU 1201 uses not only information from detection sensors of the control panel 1207 but also information from sensors independently equipped in various units (scanner unit, printer unit, and the like) other than the control panel 1207. Note that this third example assumes a situation in that the user does not make any operations on the print apparatus, i.e., a situation in that the user is not present in front of the print apparatus. This embodiment can be applied to either an apparatus which implements only, e.g., the first example or an apparatus which can implement two or more examples.

If the CPU 1201 determines based on information from the touch sensor of the control panel 1207 that none of the keys 1702 to 1704 on the window 1700 and any keys of the ten-key pad 1207*a* are operated a predetermined period of time elapsed after the display timing of the operation window 1700 on the display unit 1206 (YES in step S1811), it controls to automatically advance the process to step S1809 above even when no instruction is input (e.g., if no user instruction is input via the close key 1703 or key 1704) and to execute the process in step S1809 above (the process for inhibiting the interrupted print operation of the secure job from restarting even after removal of the print interrupt factor). In addition, the CPU 1201 controls to execute the process in step S1810 above (the process for starting the print process of another queued print job). After that, the CPU 1201 controls to advance the process to step S1007 in FIG. 10.

With the above arrangement, this embodiment can further improve the aforementioned effect.

In order to further improve the effect of this embodiment, which can achieve both the effect of maintaining the security of a secure job even after removal of the print interrupt factor and the effect of improving productivity of a job other than the secure job, the following control may be allowed to be executed. This control will be described below using FIG. 19.

Figure 19:
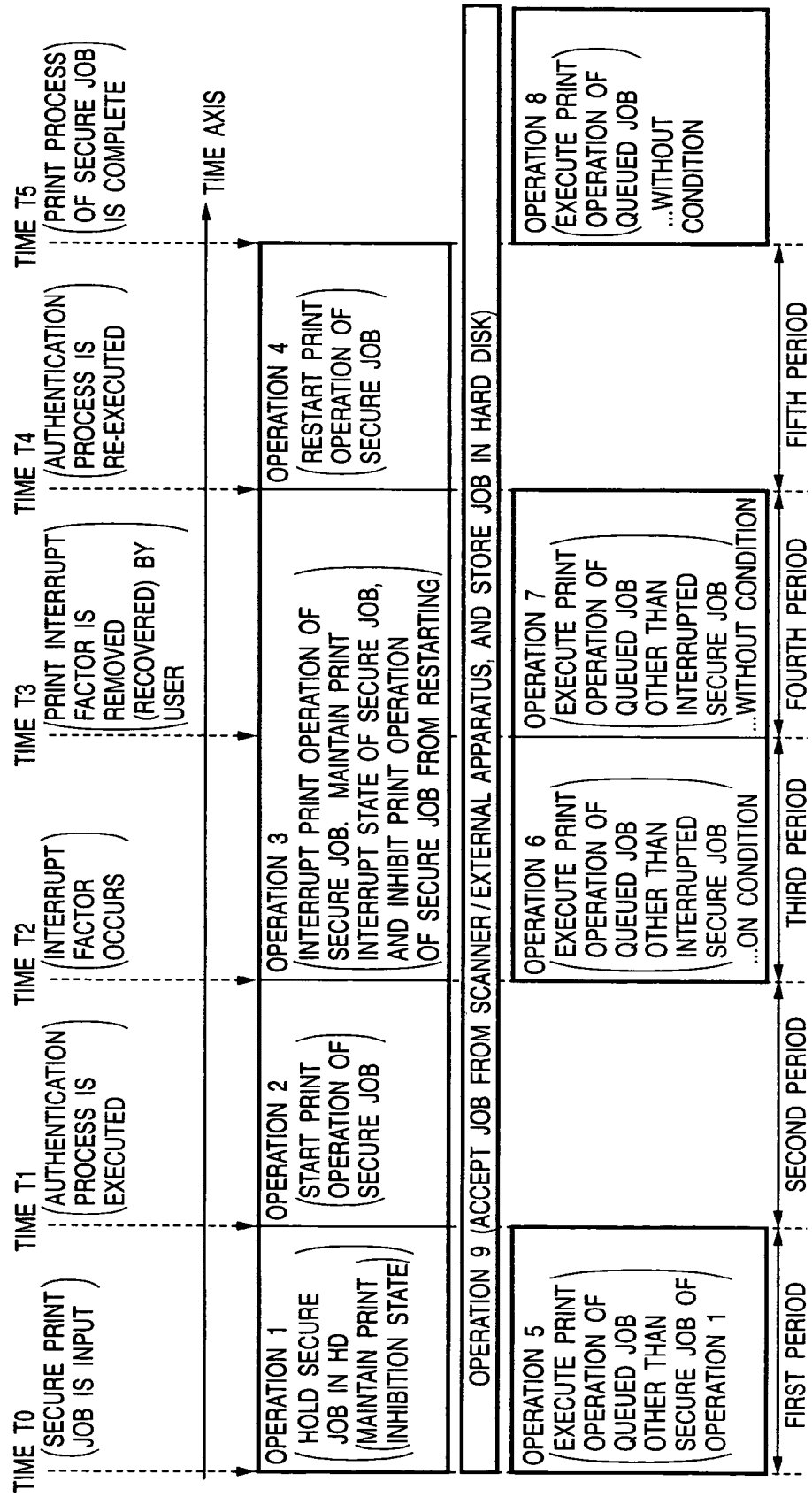
FIG. 19 is a view for explaining job process control.

FIG. 19 is a view for explaining a control example for this print apparatus by the CPU 1201 when another job is processed parallel to the operation for processing a secure job in the print apparatus, i.e., a view for explaining the processes to be executed by the print apparatuses and their timings in chronological order from the left side of the figure.

The print apparatus of this embodiment comprises the hard disk 1203 as a large-capacity memory which can store and hold image data of a plurality of jobs. By effectively utilizing such memory, a plurality of jobs can be simultaneously and parallelly processed, and an input/storage process of image data to the memory and an output process of image data from the memory can be executed synchronously or asynchronously.

For example, image data of a job including a plurality of pages are sequentially scanned by the scanner of the apparatus of this embodiment in the order of pages and are stored in the hard disk 1203. Parallel to this operation, image data of that job can be read out from the hard disk 1203 and can be printed by the printer unit 1211 (synchronous control of jobs). For example, a series of input operations for sequentially scanning image data of a job including a plurality of pages and storing them in the hard disk 1203 are executed. Parallel to (simultaneously with) this operation, image data of another job, which is different from this job and is already stored in the hard disk 1203 before that job, can be read out from the hard disk 1203 and can be printed by the printer unit 1211 (asynchronous control of jobs).

The CPU 1201 controls the print apparatus to be able to execute the job control shown in FIG. 19 using such job processing control utilizing the hard disk 1203.

For example, when a secure job is input to this print apparatus (corresponding to the timing of time T0 in FIG. 19), the CPU 1201 stores data (including image data, print condition data, and password information of that job) of that secure job in a predetermined area of the hard disk 1203 (by executing the process in, e.g., step S1001 in FIG. 10), and controls to inhibit the print operation of the secure job from starting until the print apparatus executes the authentication process of the secure job (a series of process: an input process of a user's output request instruction of the secure job via the control panel 1207→an input request of authentication data of the job via the display unit 1206→a collation process between the input authentication data and authentication data set for that job, and the like) (see operation 1 in FIG. 19).

If the CPU 1201 executes the authentication process for the secure job in response to the user operation at the control panel 1207 and determines that correct authentication data is input (corresponding to the timing of time T1 in FIG. 19), it controls to read out image data of the secure job and to start the print operation according to the print conditions of the job (see operation 2 in the second period of FIG. 19).

If it is determined during a period (corresponding to the first period in FIG. 19) from when the secure job is input until start of the print process of that secure job is permitted that the printer unit 1211 can be used and that a job to be printed is present in the print queue in the hard disk 1203, the CPU 1201 reads out another print job (e.g., a non-secure job such as a job of the normal print mode, that of the save mode, or the like) queued in the print queue other than the secure job and controls the printer unit 1211 to print that job during that period (corresponding to the first period in FIG. 19) (see operation 5 in FIG. 19).

In this manner, the CPU 1201 controls the print apparatus to execute operation 1 during the first period in FIG. 19 and to be able to execute operation 5 in FIG. 19 parallel to (simultaneously with) operation 1. In this way, the operating rate of the printer unit 1211 while start of the print process of a secure print job in this print apparatus is inhibited can be improved, thus further improving the aforementioned effect.

When the print process of the secure job is started after the authentication process for the secure job is executed at the timing of time T1 in FIG. 19, if the CPU 1201 confirms that any interrupt factor of the print operation of the secure job has occurred (e.g., when it receives out-of-paper error information from the paper cassette, when it receives paper jam error information from a print sheet jam sensor provided along a print sheet convey path in the printer unit 1211, and so forth) (corresponding to the timing of time T2 in FIG. 19), it controls to stop the operation of the printer unit 1211 and to interrupt the print operation of the secure job.

When the print operation of the secure job has been interrupted, even when the CPU 1201 detects that the print operation interrupt factor of the secure job has been removed via the operator's intervention (an operation for replenishing print sheets to the paper cassette, an operation for removing a jammed print sheet, or the like), it controls to inhibit the print operation of the secure job from restarting and to hold the image data and job information of the secure job in the hard disk 1203 unless the authentication process of the secure job is re-executed (see operation 3 in FIG. 19).

Even during a period (corresponding to the third period in FIG. 19) from when the print operation of the secure job is interrupted (the timing of time T2 in FIG. 19) until the print interrupt factor of the secure job is removed (the timing of time T3 in FIG. 19), the CPU 1201 controls the printer unit 1211 to automatically execute the print operation of another print job (e.g., a non-secure job such as a job of the normal print mode, that of the save mode, or the like) already queued in the print queue in the hard disk 1203 under some conditions, so as to improve the operating rate of the printer unit 1211 as much as possible.

For example, assume that print sheets used to print image data of the secure job are A4-sized print sheets (e.g., when A4 is set for an output paper size setup on the setup window in FIG. 4), and the CPU 1201 interrupts the print operation of the secure job in response to the absence (out-of-paper error) of the A4-sized print sheets at, e.g., time T2 in FIG. 19 during execution of the print process using the A4-sized print sheets. In this situation, for example, assume that A3-sized print sheets are set in another paper cassette as print sheets other than the A4 size, and a job which is set to use the A3-sized print sheets as those to be printed is included in other print jobs queued in the print queue in the hard disk 1203.

In this case, the CPU 1201 controls to interrupt the print operation of the secure job which is set to execute the print process using A4-sized print sheets in response to the out-of-paper error. However, since the print process of another print job in the print queue, which is set to execute the print process using A3-sized print sheets, can be executed by the printer unit 1211 (since A3-sized print sheets are available), the CPU 1201 reads out image data of this print job from the hard disk 1203, and controls the printer unit 1211 to print image data of that job on the A3-sized print sheets.

In this way, the CPU 1201 controls to interrupt the print operation of the secure job by the printer unit 1211 due to occurrence of the print interrupt factor (see operation 3 in FIG. 19), while it controls to be able to automatically start the print process of a queued job other than the secure job which is to undergo the print interrupt process depending on the contents of the print interrupt factor of the secure job at that timing (the timing of time T2 in FIG. 19) (see operation 6 in FIG. 19).

That is, the CPU 1201 controls the print apparatus to interrupt the print operation of the secure job due to occurrence of the print interrupt factor and to maintain the print interrupt state of the secure job, and also controls to be able to start the print operation of another queued print job which is free from the influence of the print interrupt factor of the secure job during the interrupt state period of the secure job.

As described above, the CPU 1201 controls this print apparatus to execute operation 3 during the third period from the timing of time T2 in FIG. 10 to the timing of time T3, and to be able to execute operation 6 above automatically (i.e., without any user's explicit instruction via the control panel 1207) under some conditions (on the basis of the contents of the interrupt factor of the secure job and the print conditions of a queued job) parallel to operation 3. In this manner, even before the print interrupt factor of the secure job is removed, the operating rate of the printer unit 1211 can be improved as much as possible, and the productivity of other print jobs in the interrupt state of the secure job in this print apparatus can be further improved.

Furthermore, during a period (corresponding to the fourth period in FIG. 19) from when it is detected that the print interrupt factor of the secure job is removed (the timing of time T3 in FIG. 19) until the timing (corresponding to the timing of time T4 in FIG. 19) immediately before the print operation of the secure job is restarted by the printer unit 1211 on the basis of the result of the authentication process (including the processes in steps S1412 and S1413 in FIG. 14) of the secure job, the CPU 1201 controls to maintain the interrupt state of the print operation of the secure job and to inhibit the print operation of the secure job from restarting (see operation 3 in FIG. 19), and controls to start the print process of another print job already queued in the print queue in the hard disk 1203 other than the secure job whose print process has been interrupted (see operation 7 in FIG. 19).

Operation 7 in FIG. 19 is slightly different from operation 6 above. Conditions that permit to execute operation 6 are: for example, when a condition that the interrupt factor of the secure job is not occurrence of an error event such as paper jam or the like but is the absence of expendables (print sheets, toner, staples, or the like) of this print apparatus to be used under the print condition of the secure job to be processed (condition 1) and a condition that a print job set with the print processing conditions which are free from the influence of such print interrupt factor of the secure job is stored as a queued job in the hard disk 1203 (condition 2), i.e., conditions 1 and 2, are satisfied, operation 6 is permitted to be executed parallel to operation 3. For example, when the print apparatus has the copy function, and the print operation of a secure job must be interrupted due to occurrence of an error such as document jam or the like in the scanner unit, since the printer unit is ready to operate, operation 6 is permitted to be executed parallel to operation 3. Basically, when both conditions 1 and 2 are not satisfied, the CPU 1201 controls to inhibit operation 6 from being executed parallel to operation 3.

On the other hand, at the stage of operation 7 in FIG. 19, since the print interrupt factor of the secure job has already been removed, no limitations are placed unlike in operation 6. That is, as has been explained above using FIGS. 17 and 18, during the period (corresponding to the fourth period in FIG. 19), included in the restart inhibition period of the interrupted print operation of the secure job, from when the print interrupt factor of the secure job is removed (the timing of time T3 in FIG. 19) until the timing (corresponding to the timing of time T4 in FIG. 19) immediately before the print operation of the secure job is restarted, if a queued job other than the secure job whose print process has been interrupted is stored in the hard disk 1203, the CPU 1201 reads out image data of that queued job irrespective of the contents of the print interrupt factor of the secure job unlike in operation 6, and controls the printer unit 1211 to print that job in accordance with the print conditions of the job. If a plurality of jobs are queued, the CPU 1201 controls to process these queued jobs in turn in the order they are queued (corresponding to the processes in step S1809 and S1810 in FIG. 18).

In this way, during the fourth period from the timing of time T3 in FIG. 10 to the timing of time T4, the CPU 1201 controls the print apparatus to execute operation 3, and to execute operation 7 parallel to operation 3 manually (corresponding to a case wherein the user explicitly issues an instruction via the control panel 1207; YES in step S1808 in FIG. 18) or automatically (corresponding to a case wherein the user does not explicitly input any instruction via the control panel 1207; YES in step S1811 in FIG. 18) without placing any conditions unlike in operation 6 (independently of the contents of the interrupt factor of the secure job). In this manner, the aforementioned effect can be obtained.

The CPU 1201 controls to permit restart of the print operation of the job whose print process has been interrupted in response to removal of the interrupt factor of the secure job and re-execution of the authentication process of the secure job (the timing of time T4 in FIG. 19). That is, the CPU 1201 reads out the image data and job information of the secure job whose print process has been interrupted from the hard disk 1203, and controls the printer unit 1211 to complete the print operation of the secure job from the interrupt timing of the print operation (see operation 4 in FIG. 19).

Upon completion of the print operation of the secure job, which is restarted from the timing of time T4 (upon completion of print processes of all output copies of pages of the image data of the secure job, which are set by the user), the CPU 1201 controls to automatically start the print operation of other queued print jobs in the hard disk 1203 (i.e., without any explicit user instruction input via the control panel 1207) (see operation 8 in FIG. 19).

As described above, since the processes of a plurality of jobs can be dynamically and parallelly executed, the aforementioned effect of this embodiment can be further improved.

In addition, in order to further improve the above effect, the CPU 1201 accepts a new print job from a print job submission source (e.g., the scanner of the print apparatus itself or an external apparatus such as a host computer, facsimile apparatus, another image forming apparatus, i.e., an apparatus that can serve as a generation source of image data) even when it is executing any of operations 1 to 8 during a period including at least a period from time T0 to time T5 (the first to fifth periods in FIG. 19). In addition, the CPU 1201 stores and holds the accepted new print job in the hard disk 1203 to enqueue that new job in the print queue in the hard disk. When a print turn of that job is reached, the CPU 1201 can immediately start its print operation (see operation 9 in FIG. 19).

By controlling the print apparatus to execute such operation 9 parallel to operations 1 to 8, the aforementioned effect can be further improved.

Note that the control examples described using FIGS. 17 to 19 need not always be required constituent elements since the specification considers user's merits, use environments, and the like.

Third Embodiment

In the first embodiment, a print process is started from the next page to be printed upon restarting the print process after the print process of a secure job has been interrupted. However, it is often difficult to attain such print process depending on the types of print interrupt factors.

Printouts based on a secure job are often strictly managed. Hence, when pages are printed by assigning serial numbers to printouts, the serial number of the page printed immediately before the print process is interrupted due to occurrence of a print interrupt factor and the serial number of the page printed first after restart may not become serial numbers.

A print process according to this embodiment that solves this problem will be described below with reference to FIG. 16 which is the flowchart of that process. In the flowchart shown in FIG. 16, steps S1601 and S1602 are inserted at positions shown in FIG. 16 in the flowchart shown in FIG. 14 as that of the print process according to the first embodiment, and other steps are the same as those in the first embodiment. Hence, the same step numbers in FIG. 16 denote the same steps as those in FIG. 14, and a description thereof will be omitted.

The type of a print interrupt factor is checked in step S1601. If it is determined that the print interrupt factor is a job script error, i.e., that a normal print job syntax is not adopted, and the print process of the next page to be printed is unlikely to be guaranteed even after the print process is restarted, the flow advances to step S1602 to delete this secure job from the print queue. That is, since printouts based on a secure job must be strictly managed, as described above, when unique serial numbers are assigned to respective pages, if these numbers are not serial numbers, such printouts are defective. Hence, even when the print process is restarted, if the print process of the next page to be printed is unlikely to be guaranteed, the print process that generates such printouts is aborted and that secure job is deleted, thus preventing the aforementioned trouble.

In this embodiment, in order to delete the secure job in step S1602, a message that advises accordingly may be sent to the PC that submitted this secure job to the print apparatus, or such delete history may be saved in the hard disk 1203 in the print apparatus.

In this embodiment, the secure job is deleted in step S1602 in order to avoid the aforementioned trouble. Alternatively, the CPU 1201 may control the printing device 1211 to print that secure job from the very beginning in step S1602.

Fourth Embodiment

In the above embodiments, a print job (including header information) is submitted from the external PC to the print apparatus. However, the present invention is not limited to such specific arrangement. For example, the print apparatus may generate a print job that prints an image which is scanned by the scanner 1210 and is saved in the hard disk 1203.

In this case, the print apparatus can generate a print job required to control the printing device 1211 to print the scanned image by executing the same process (the process according to the flowchart shown in FIG. 2) as that executed by the PC.

After the print job is generated, the print apparatus can execute the same print process as in the first embodiment. In this way, the input source of a print job to the print apparatus is not limited to that in the first embodiment, and various other sources may be adopted.

Other Embodiments

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements novel functions of the present invention, and the recording medium which stores the program code constitutes the present invention.

The functions of the above-mentioned embodiments may be implemented not only by executing the readout program code by the computer but also by some or all of actual processing operations executed by an OS or the like running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

When the present invention is applied to the recording medium, that recording medium stores program codes corresponding to the aforementioned flowcharts.

As described above, according to this embodiment, the problems described in the prior arts can be solved. For example, when a factor that interrupts a print process occurs, and the print process is restarted after this factor is removed, the print process that maintains high security can be made. In addition, not only the security of a job that requires a high security level can be maintained even after removal of the print interrupt factor, and the productivity of print jobs other than such job can be sufficiently taken into consideration. For example, both the effect of maintaining high security of a print job that requires a high security level and the effect of improving the productivity of jobs other than jobs of this type can be achieved. Hence, a convenient apparatus and system can be provided, and an optimal use environment that can flexibly meet various needs of various users can be built.

As many apparently widely different embodiments of the present invention can be made without departing from the spirit and scope thereof, it is to be understood that the invention is not limited to the specific embodiments thereof except as defined in the claims.

Claim of Priority

This application claims priority from Japanese Patent Applications No. 2003-383035 filed on Nov. 12, 2003 and No. 2004-287995 filed on Sep. 30, 2004, which are hereby incorporated by reference herein.

What is claimed is:

1. A print apparatus which comprises checking means for checking whether or not a print job is a secure print job requiring an authentication process to execute a print process of the secure print job, first input means for, when the authentication process is required, prompting a user to input authentication data for the secure print job and accepting the authentication data, and print means for executing the print process of the secure print job when the authentication data input by said first input means is authenticated, or executing a print process of a print job which does not require the authentication process, comprising:

second input means for, when a print process of the secure print job has been interrupted due to occurrence of a print interrupt factor which causes a print interrupt, and the print process of the secure print job is ready to be restarted due to the print interrupt factor being removed, prompting the user to input the authentication data for the secure print job before the interrupted print process is restarted, and accepting the authentication data; and control means for, when the print process of the secure print job is interrupted due to occurrence of the print interrupt factor, controlling said print means to encrypt print data of the secure print job, and for, when the print interrupt factor is removed and the authentication data input by said second input means is authenticated, controlling said print means to decrypt the encrypted print data of the secure print job and restart the interrupted print process of the secure print job by using the decrypted print data.

2. The apparatus according to claim 1, wherein when the authentication data input by said second input means is not authenticated, said control means inhibits the interrupted print process of the secure print job from restarting.

3. The apparatus according to claim 1, wherein when the authentication data input by said second input means is not authenticated, said control means deletes the interrupted print process of the secure print job.

4. A print method which comprises a checking step of checking whether or not a print job is a secure print job requiring an authentication process to execute a print process of the secure print job, a first input step of prompting, when the authentication process is required, a user to input authentication data for the secure print job and accepting the authentication data, and a print step of executing the print process of the secure print job, when the authentication data input in the first input step is authenticated, or executing a print process of a print job which does not require the authentication process, comprising:

an encryption step of encrypting print data of the secure print job when the print process of the secure print job is interrupted due to occurrence of a print interrupt factor which causes print interrupt:

a second input step of prompting, when a print process of the secure print job has been interrupted due to occurrence of the print interrupt factor and the print process of the secure print job is ready to be restarted due to the print interrupt factor being removed, the user to input the authentication data for the secure print job before the interrupted print process is restarted, and accepting the authentication data; and a control step of controlling, when the print interrupt factor is removed and the authentication data input in the second input step is authenticated, a process in the print step to decrypt the encrpted print data of the secure print job and to restart the interrupted print process of the secure print job by using the decrypted print data.

5. A computer-readable storage medium storing a computer-executable program making a computer execute a print method of claim 4.

6. A print apparatus for controlling a print unit to execute a print process based on print data of a print job, comprising:

a storage unit which stores print data of a print job; and a control unit which controls said storage unit to store encrypted print data of a secure print job when a print process of the secure print job is interrupted due to occurrence of a print interrupt factor which causes print interrupt, wherein the secure print job requires an authentication process to execute the print process of the secured print job, and wherein, when the print interrupt factor is removed and authentication data for the secure print job is authenticated in the authentication process, said control unit controls said print unit to restart the interrupted print process of the secure print job after the encrypted print data stored in the storage unit is decrypted.

7. The apparatus according to claim 6, further comprising:

an input unit which prompts a user to input the authentication data for the secure print job and which accepts the authentication data.

8. The apparatus according to claim 6, wherein when the authentication data is not authenticated, said control unit inhibits the interrupted print process of the secure print job from restarting.

9. The apparatus according to claim 8, wherein, while restarting of the interrupted print process of the secure print job is inhibited, said control unit enables said print unit to execute a print process of another print job which is different from the secure print job.

10. A print method for controlling a print unit to execute a print process based on print data of a print job, comprising:

a storing step of storing in a storage unit encrypted print data of a secure print job when a print process of the secure print job is interrupted due to occurrence of a print interrupt factor which causes print interrupt, wherein the secure print job requires an authentication process to execute the print process of the secured print job; and a controlling step of controlling, when the print interrupt factor is removed and authentication data for the secure print job is authenticated in the authentication process, the print unit to restart the interrupted print process of the secure print job after the encrypted print data stored in the storage unit is decrypted.

11. The method according to claim 10, further comprising:

an encrypting step of encrypting the print data of the secure print job when the print process of the secure print job is interrupted due to the occurrence of the print interrupt factor; and a decrypting step of decrypting the encrypted print data stored in the storage unit before the interrupted print process of the secure print job is restarted.

* * * * *